United States Patent

Morooka

[11] Patent Number: 5,623,364
[45] Date of Patent: Apr. 22, 1997

[54] VIBRATION-PROOF OPTICAL SYSTEM

[75] Inventor: Masaru Morooka, Machida, Japan

[73] Assignee: Olympus Optical Co., Ltd., Tokyo, Japan

[21] Appl. No.: 473,772

[22] Filed: Jun. 6, 1995

[30] Foreign Application Priority Data

Jun. 7, 1994 [JP] Japan .................................. 6-124959

[51] Int. Cl.$^6$ ............................. G02B 27/64; G02B 15/14
[52] U.S. Cl. ........................ 359/557; 359/554; 359/676
[58] Field of Search .................................. 359/554–557, 359/676–690; 354/70, 430

[56] References Cited

U.S. PATENT DOCUMENTS

| | | | |
|---|---|---|---|
| 4,844,602 | 7/1989 | Kitagishi et al. | 359/557 |
| 4,978,205 | 12/1990 | Sato | 359/557 |
| 5,018,845 | 5/1991 | Yamazaki | 359/557 |
| 5,039,211 | 8/1991 | Maruyama | 359/557 |
| 5,069,537 | 12/1991 | Kitagishi | 359/557 |
| 5,172,268 | 12/1992 | Kikuchi | 359/557 |
| 5,182,671 | 1/1993 | Kitagishi et al. | 359/557 |
| 5,249,079 | 9/1993 | Umeda | 359/554 |
| 5,270,857 | 12/1993 | Oizumi et al. | 359/554 |
| 5,387,999 | 2/1995 | Hayashi | 359/557 |
| 5,539,576 | 7/1996 | Ito | 359/557 |

FOREIGN PATENT DOCUMENTS 281020  3/1990  Japan .

OTHER PUBLICATIONS

Matsui, Y. Theory of Third–Order Aberrations of Optical Systems in Which Decentration Exists, Jun. 1990 see Spec. p. 8.

Primary Examiner—Thong Nguyen
Attorney, Agent, or Firm—Cushman, Darby & Cushman IP Group of Pillsbury Madison & Sutro LLP

[57] ABSTRACT

The invention achieves a vibration-proof optical system which is designed so that when a picture-taking lens vibrates or shakes, the resultant blurring of the image can be well compensated for rapidly and without incurring deterioration of the ability to form images, and which is small and simple in structure as well. A meniscus lens L convex on the image surface is located between principal lens systems G1 to G4 forming an object image and the image surface. The blurring of the image that occurs by the inclination of the entire picture-taking lens system is compensated for by the tilting of the meniscus lens L with respect to the optical axis. The image blur compensating lens L of such construction is of lens shape that enables decentration aberration coefficients to be reduced, so making it possible to inhibit the occurrence of a "point image blur" or an "image expansion and compression" and, hence, to keep the ability to form images in a good enough state even in the presence of an image blur. For this reason, an aberration variation due to the rotation of the image blur compensating optical system L is so reduced that the ability to form images can be kept in a good enough state even when the taking optical system moves unintentionally.

8 Claims, 14 Drawing Sheets

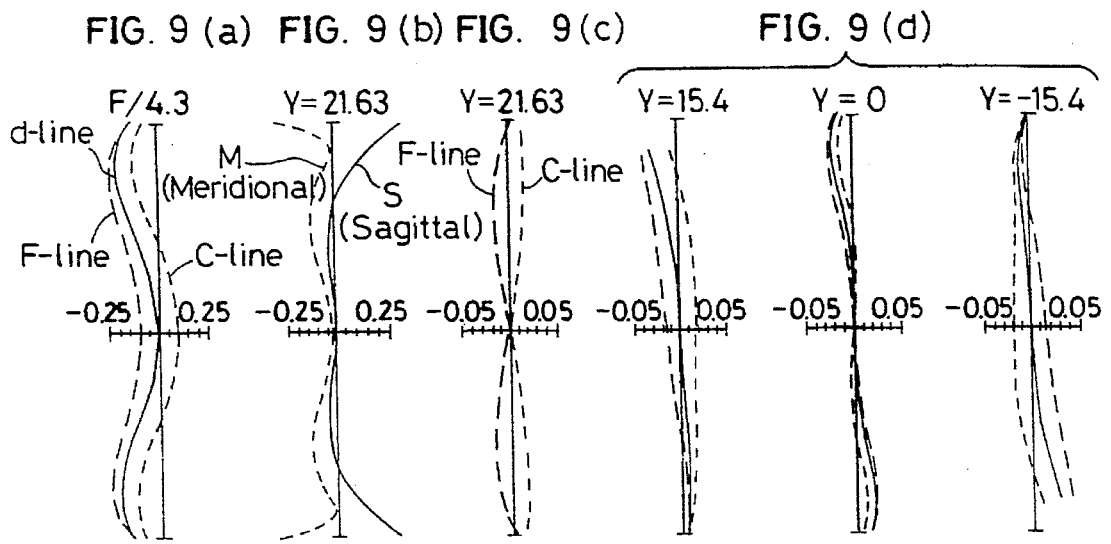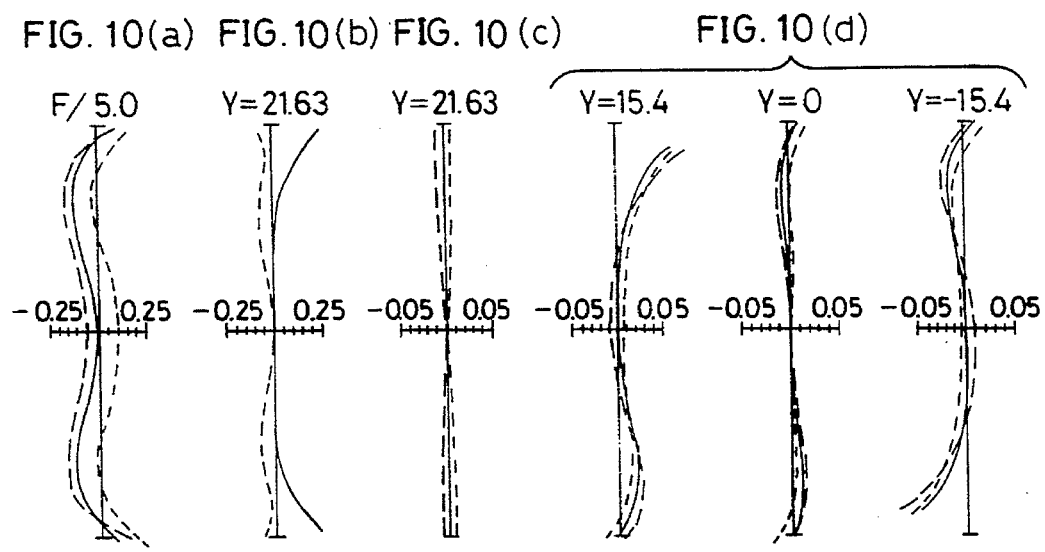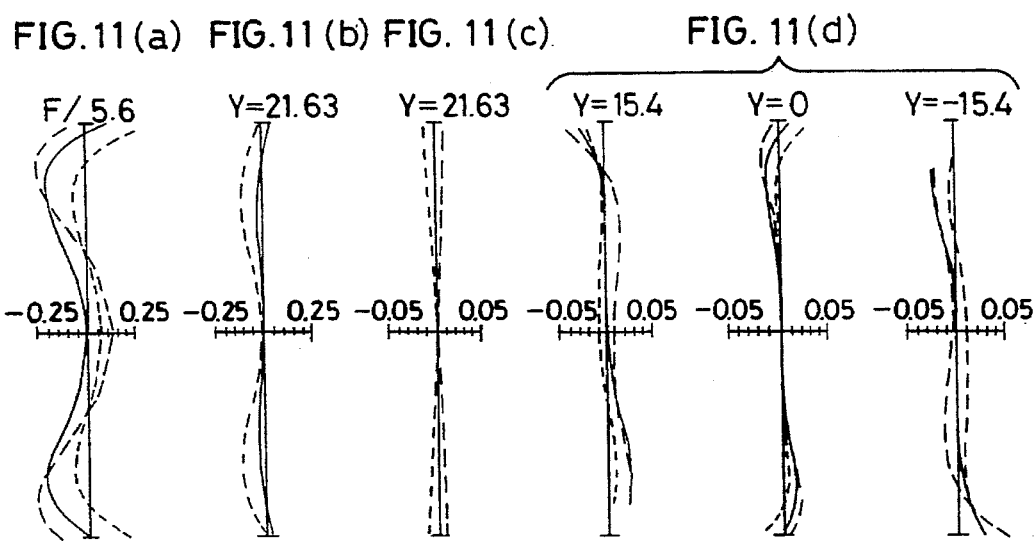

FIG. 12(a) FIG. 12(b) FIG. 12(c) FIG. 12(d)
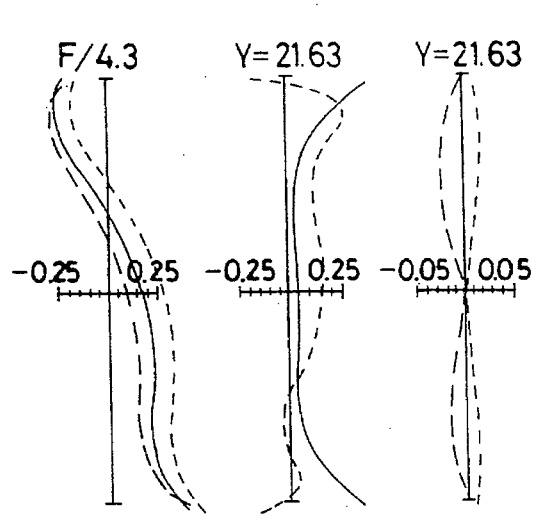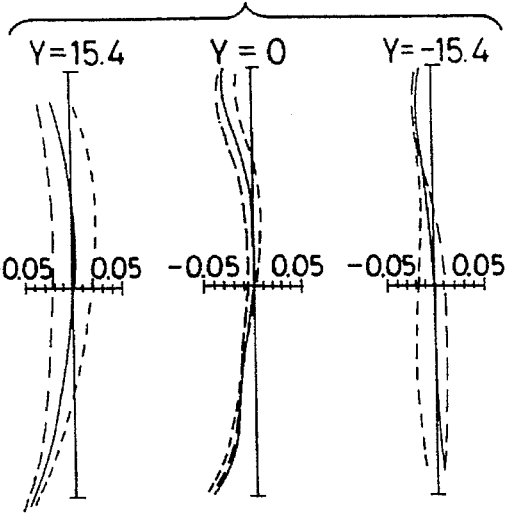
FIG. 13(a) FIG. 13(b) FIG. 13(c) FIG. 13(d)
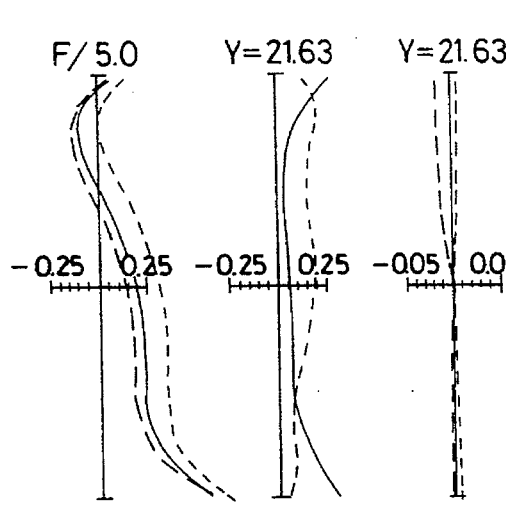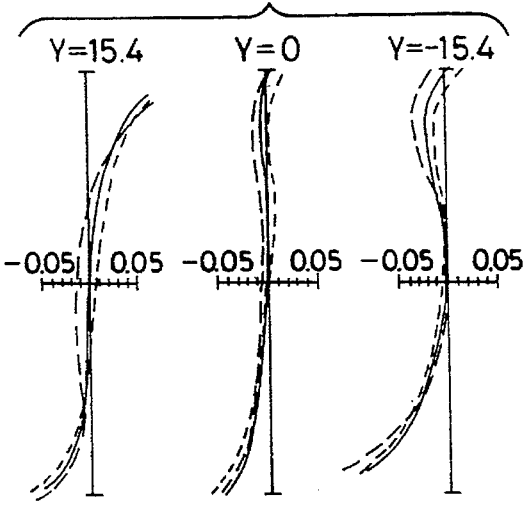
FIG. 14(a) FIG. 14(b) FIG. 14(c) FIG. 14(d)
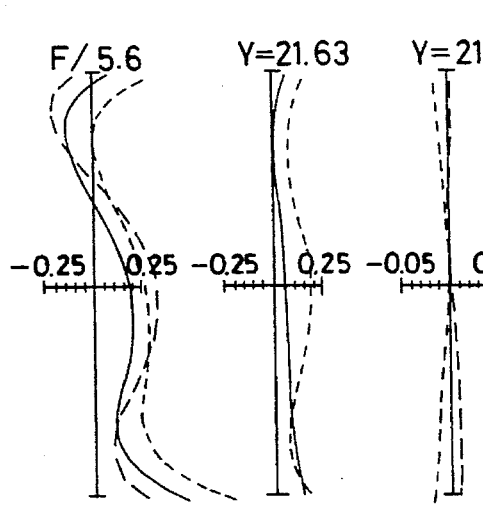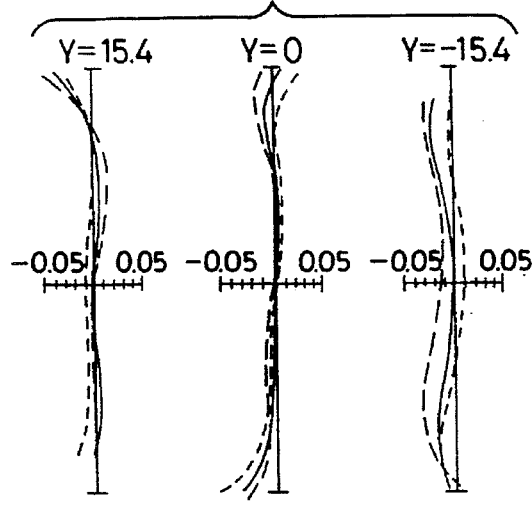

FIG.15(a) FIG.15(b) FIG.15(c) FIG.15(d)
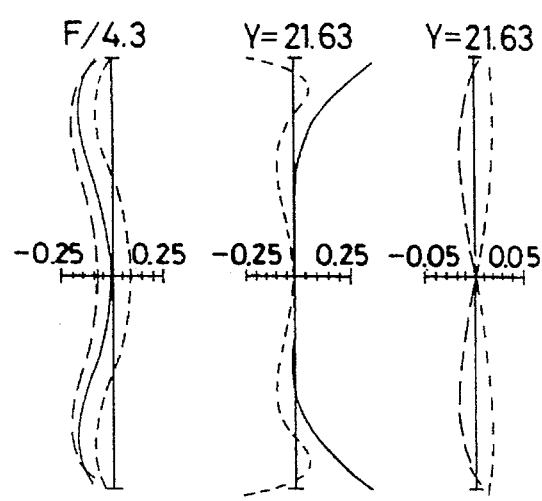
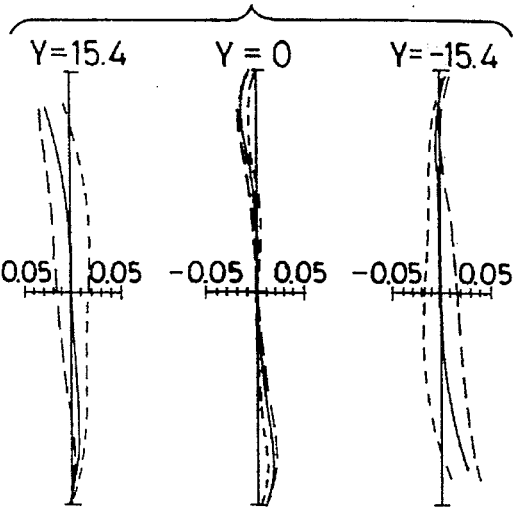
FIG.16(a) FIG.16(b) FIG.16(c) FIG.16(d)
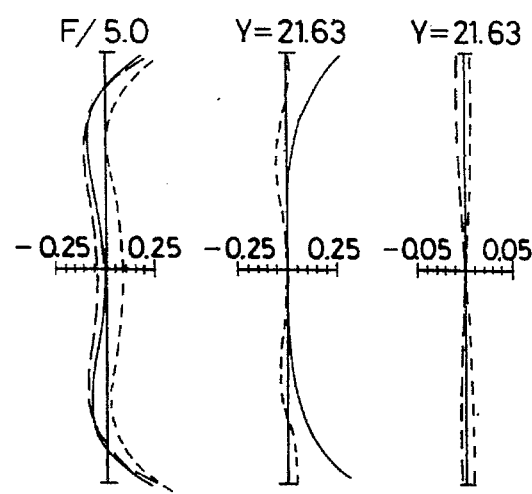
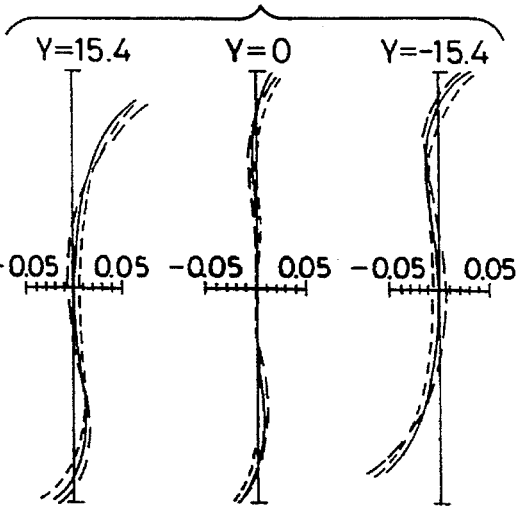
FIG.17(a) FIG.17(b) FIG.17(c) FIG.17(d)
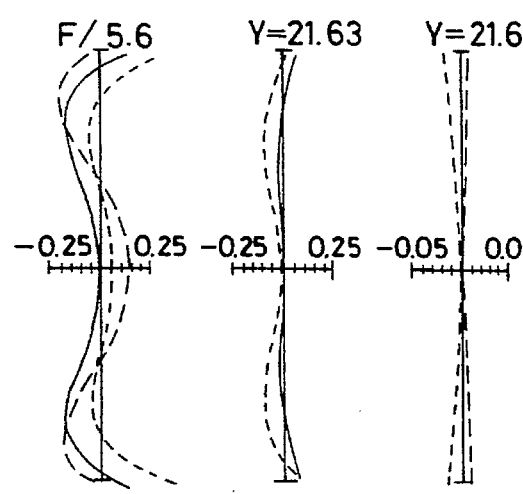
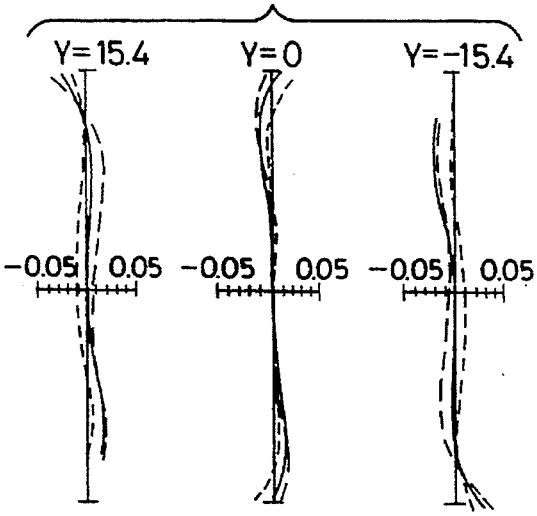

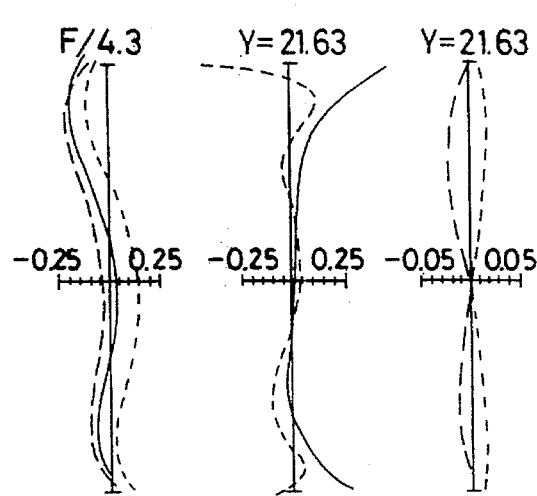
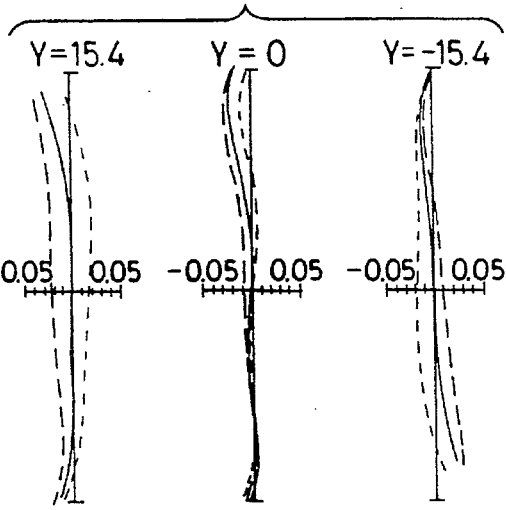
FIG.18(a) FIG.18(b) FIG.18(c) FIG.18(d)
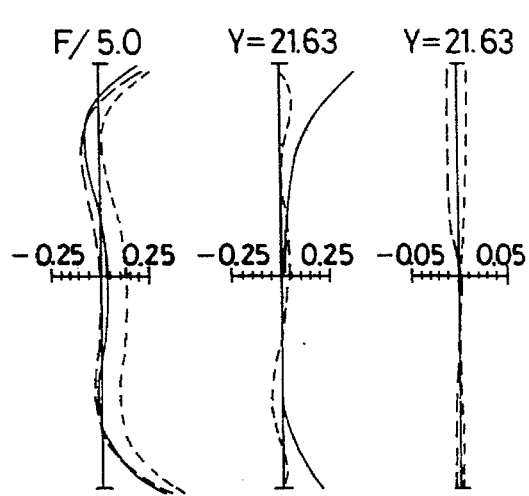
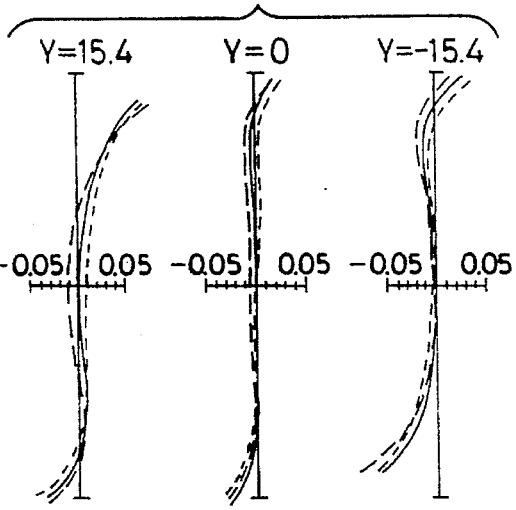
FIG.19(a) FIG.19(b) FIG.19(c) FIG.19(d)
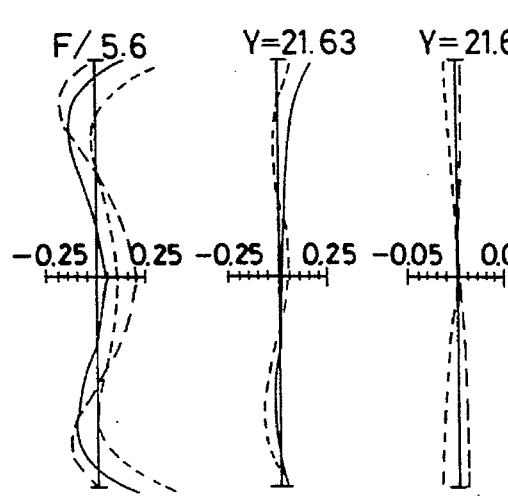
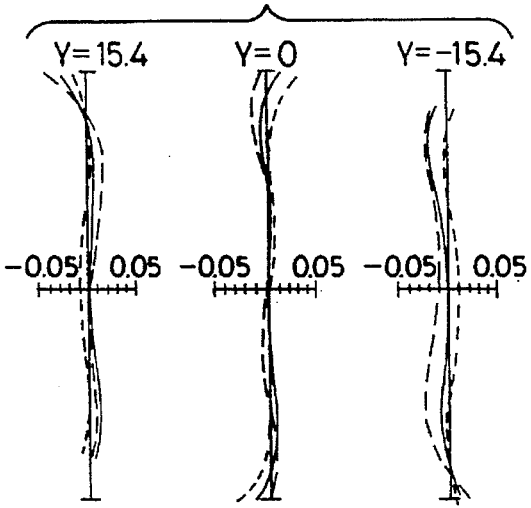
FIG.20(a) FIG.20(b) FIG.20(c) FIG.20(d)

FIG. 21(a) FIG. 21(b) FIG. 21(c) FIG. 21(d)
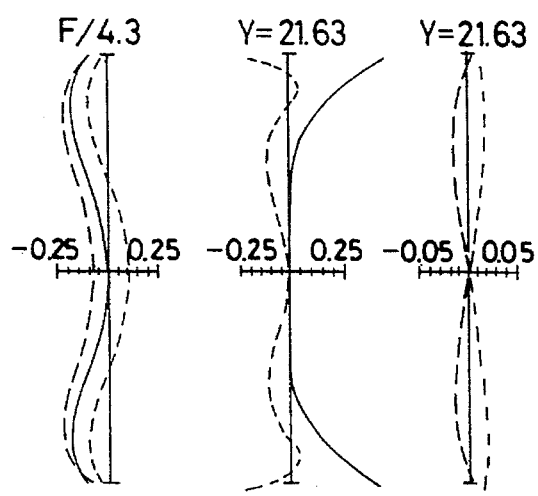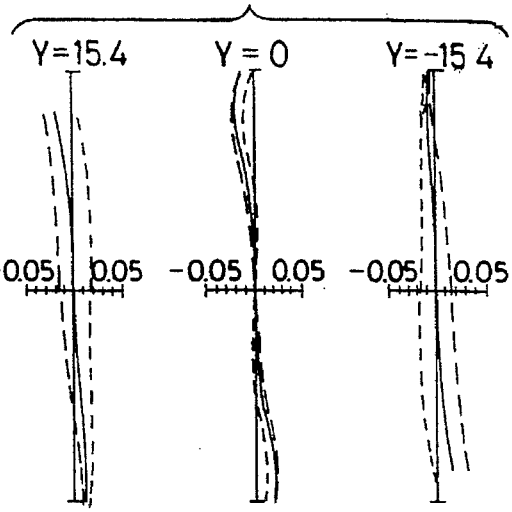
FIG. 22(a) FIG. 22(b) FIG. 22(c) FIG. 22(d)
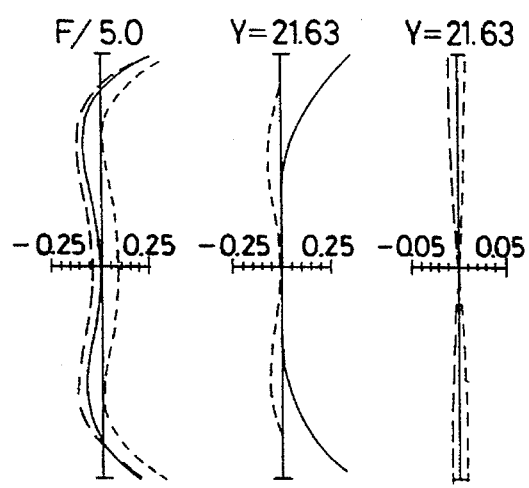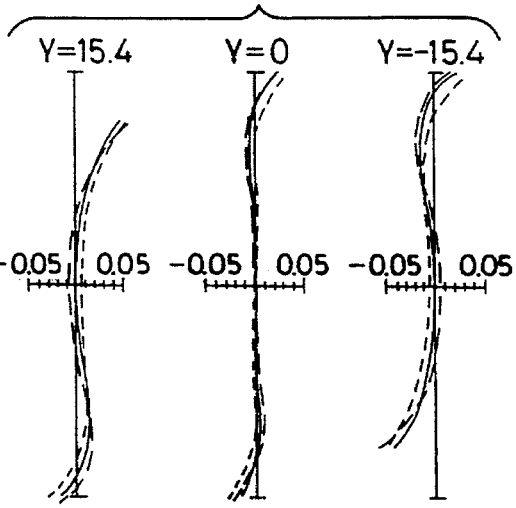
FIG. 23(a) FIG. 23(b) FIG. 23(c) FIG. 23(d)
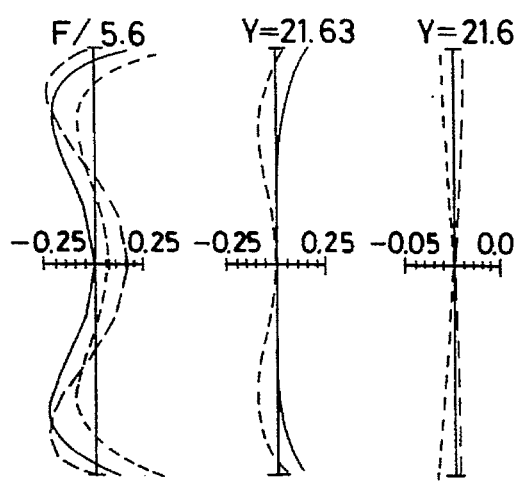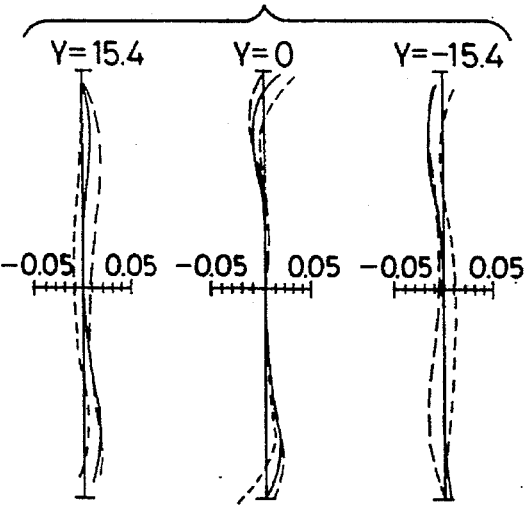

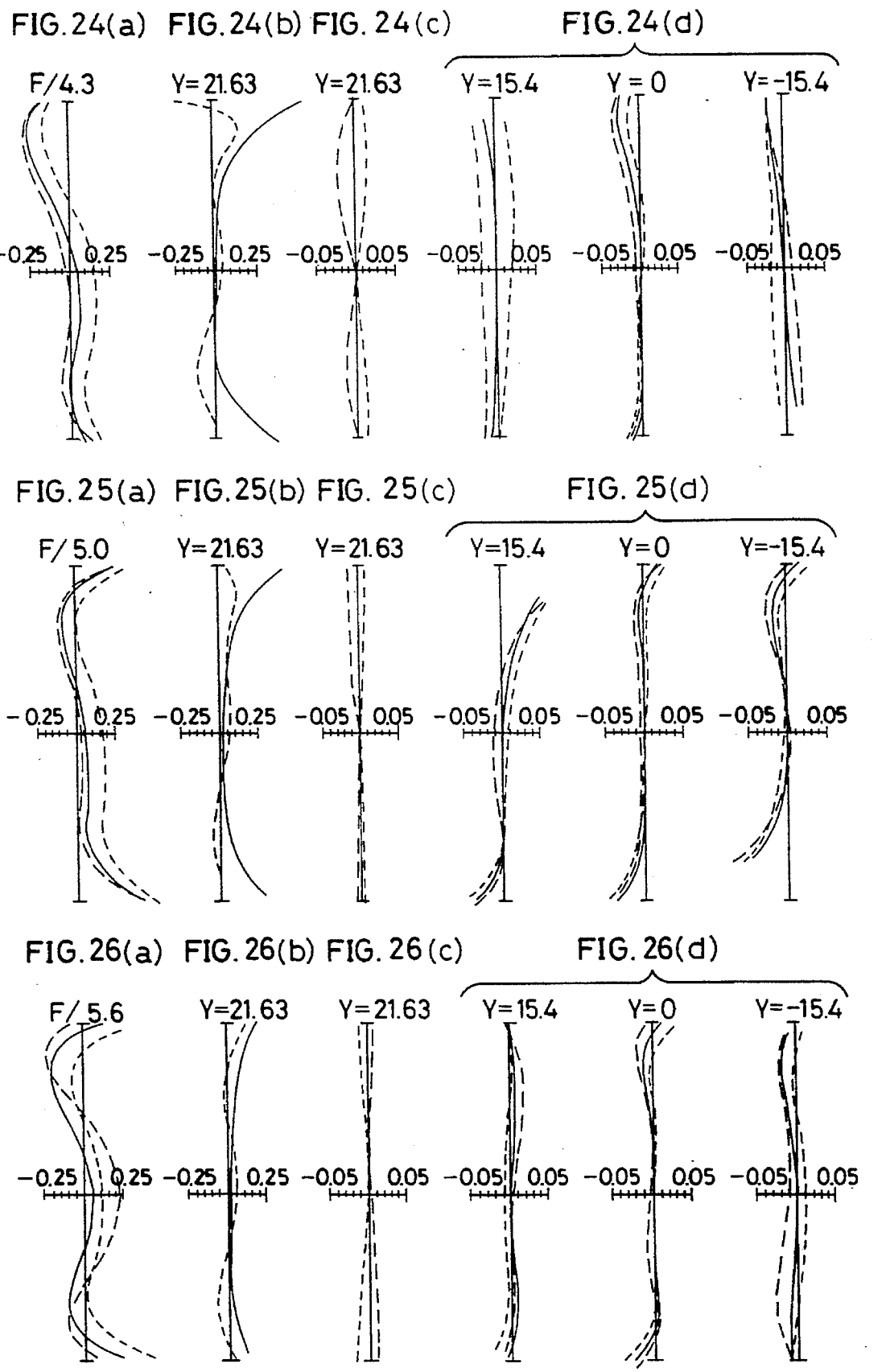

VIBRATION-PROOF OPTICAL SYSTEM

BACKGROUND OF THE INVENTION

1. Field of the Invention

The present invention relates generally to a vibration-proof optical system, and more particularly to a vibration-proof optical system that is suitably mounted on a picture-taking system for photographic or video cameras to compensate for image defects, esp., image blurs caused by vibrations or other shakes.

2. Background of Related Art

When photographic or video cameras are used to take photographs from within cars or airplanes while they are on the move, vibrations are transmitted to the picture-taking systems, resulting in image defects or blurs. Prior means for eliminating such defects, for instance, are disclosed in JP-A 1-191112, 1-191113, 2-35406, 2-81020, 2-124521 and 3-141318 as well as U.S. Pat. Nos. 5,069,537 and 4,844,602.

It is here to be noted that JP-A 1-191112, 1-191113 and 2-35406 correspond together to U.S. Pat. No. 5,270,857; JP-A 2-81020 to U.S. Pat. No. 5,182,671; JP-A 2-124521 to U.S. Pat. No. 5,039,211; and JP-A 3-141318 to U.S. Pat. No. 5,172,268.

JP-A 1-191112, 1-191113 and 2-35406 teach a taking lens system comprising a plurality of lens units or groups, some of which are moved in a direction perpendicular to the optical axis for compensating for image blurs.

JP-A 2-81020 and 2-124521 disclose a taking lens system comprising a plurality of lens units, some of which are moved in a direction perpendicular to the optical axis or rotated around a certain fixed point to make compensation for image blurs.

JP-A 3-141318 shows a principal lens system for forming an object image. Between this principal lens system and the image surface there is a meniscus lens concave on the exit pupil of the principal lens system, which is in turn rotated around one point on the optical axis for compensating for image blurs.

A problem with the systems disclosed in JP-A 1-191112, 1-191113, 2-35406, 2-81020 and 2-124521 are, however, that the decentering drive lens unit for compensating for image blurs also serves as a lens unit that is moved in the optical axis direction during zooming, making the lens drive mechanism complicated in structure. Another problem is that control loads for driving a plurality of lenses in a decentering manner, too, lead to size increases.

A problem with the system disclosed in JP-A 3-141318 is that when the amount of rotation of the compensating lens is increased, there is a need of allowing for a space to prevent interference of the final lens of the principal lens system and the compensating lens, because the compensating lens is a meniscus lens concave on the exit pupil. Another problem is that the amount of rotation of the compensating lens must be increased to compensate for a large image blur, making it difficult to compensate for deterioration of the ability to form images after the rotation.

SUMMARY OF THE INVENTION

In view of the above-mentioned problems associated with the prior art, it is an object of the present invention to provide a vibration-proof optical system that enables an image blur caused by unintentional movement of a picture-taking lens to be well compensated for rapidly and without giving rise to deterioration of the ability to form images, and is of small and simple construction as well.

According to the present invention, this object is achieved by the provision of a vibration-proof optical system comprising a principal lens system including a plurality of lenses and having a positive refracting power as a whole, a blur compensating lens located in the rear of the principal lens system and including a meniscus lens element concave on the image side, a photographic receiving element located on an image surface in the rear of the blur compensating lens, and a drive means for tilting and decentering the blur compensating lens to compensate for an image blur caused by the inclination of the principal lens system.

In one embodiment of the present invention, the principal lens system is designed to include a first lens unit of positive refracting power, a second lens unit having negative refracting power, a third lens unit having positive refracting power and a fourth lens unit having positive refracting power, as viewed in order from the object side. When the principal lens system is designed as a zoom lens system, zooming may be achieved by varying the space between the respective lens units in the lens units 1 to 4.

In the present invention, it is desired that at least one of the following conditions (1), (2) and (3) be satisfied:

$$0.9 < \beta_1 < 1.1 \tag{1}$$

$$0.05 < |(R_1 - R_2)/(R_1 + R_2)| < 0.5 \tag{2}$$

$$0.23 \times 10^{-3} < (d/D)((n-1)/\{\sqrt{(n^2 - \sin^2\theta)}\} + (1/n) - 1) < 2.31 \times 10^{-3} \tag{3}$$

Here $\beta_1$ is the paraxial lateral magnification of the meniscus lens, $R_1$ and $R_2$ are the radii of curvature of the entrance and exit surfaces of the meniscus lens, respectively, D is a half of the diagonal length of the image surface, and d, n and $\theta$ are the thickness, index of refraction and angle of rotation of the meniscus lens, respectively.

Furthermore in such cases, it is desired that the following condition (4) or (5) be satisfied:

$$0.05 < |(R_1 - R_2)/(R_1 + R_2)| < 0.4 \tag{4}$$

$$0.23 \times 10^{-3} < (d/D)((n-1)/\{\sqrt{(n^2 - \sin^2\theta)}\} + (1/n) - 1) < 1.5 \times 10^{-3} \tag{5}$$

Still other objects and advantages of the present invention will in part be obvious and will in part be apparent from the specification.

BRIEF DESCRIPTION OF PREFERRED EMBODIMENTS

Figure 1:
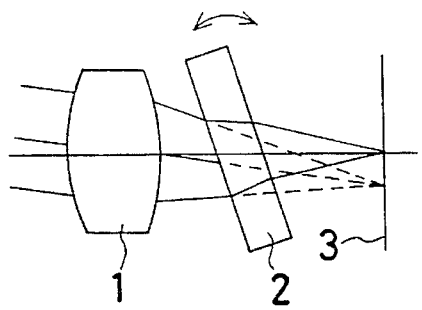
FIG. 1 is a sectional view of a vibration-proof optical system using a plane-parallel plate.
Figure 3:
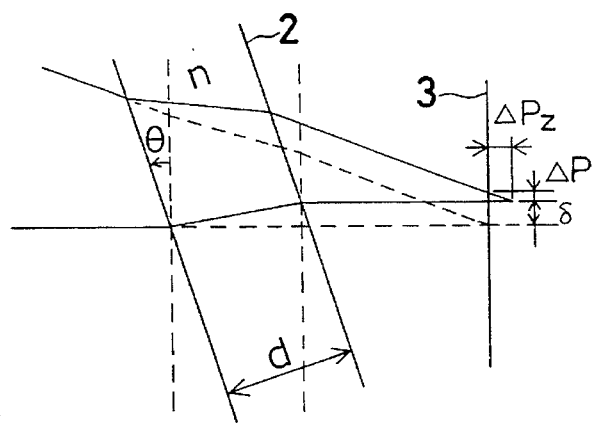
Figure 4:
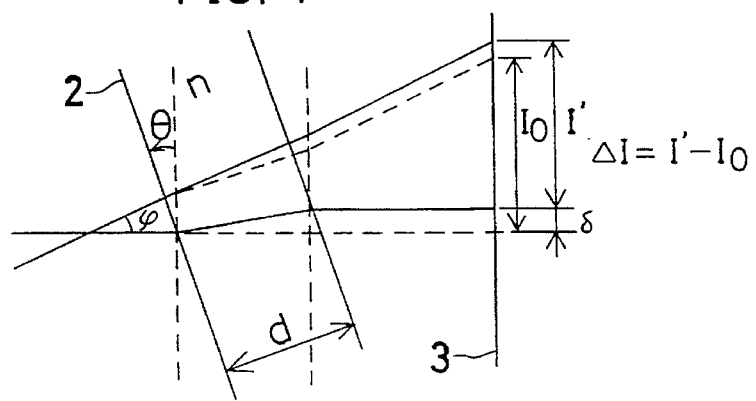
Figure 5:
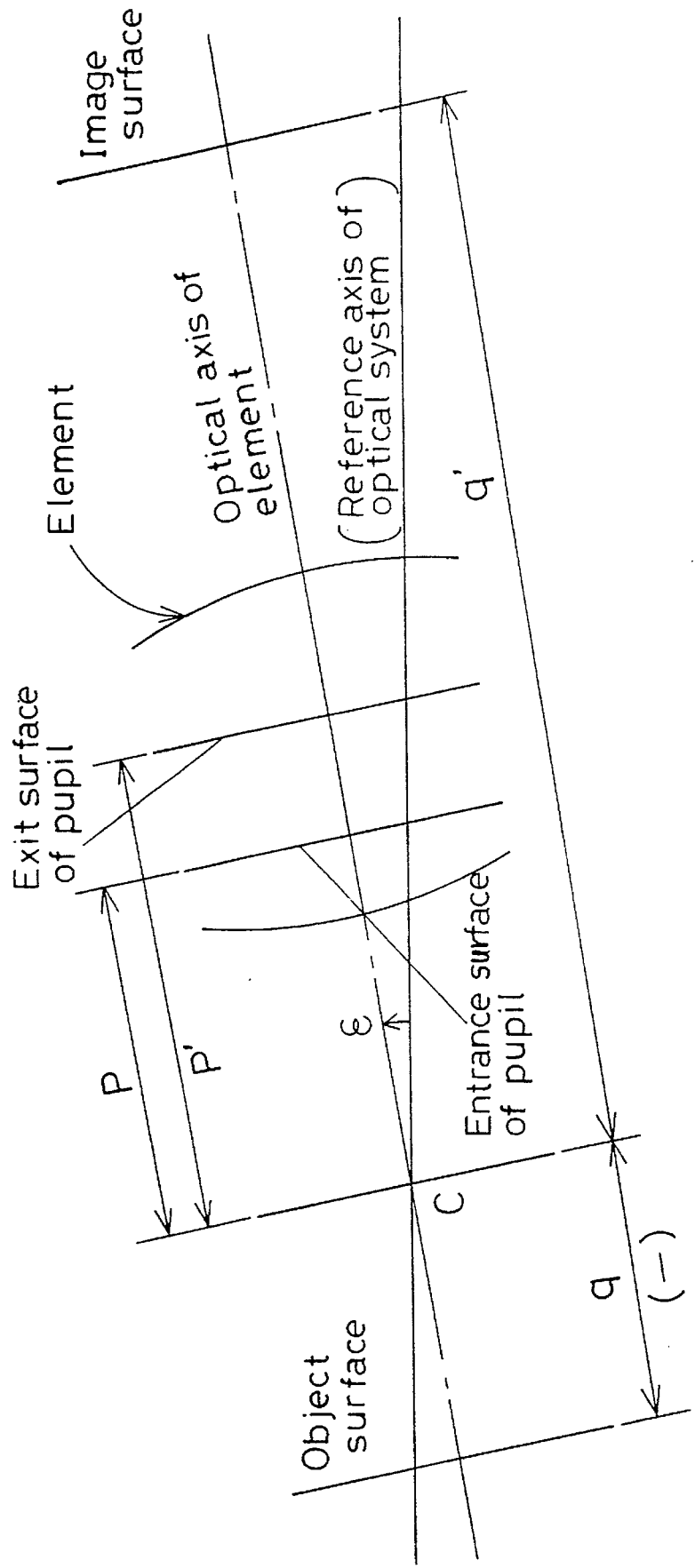
Figure 6A:
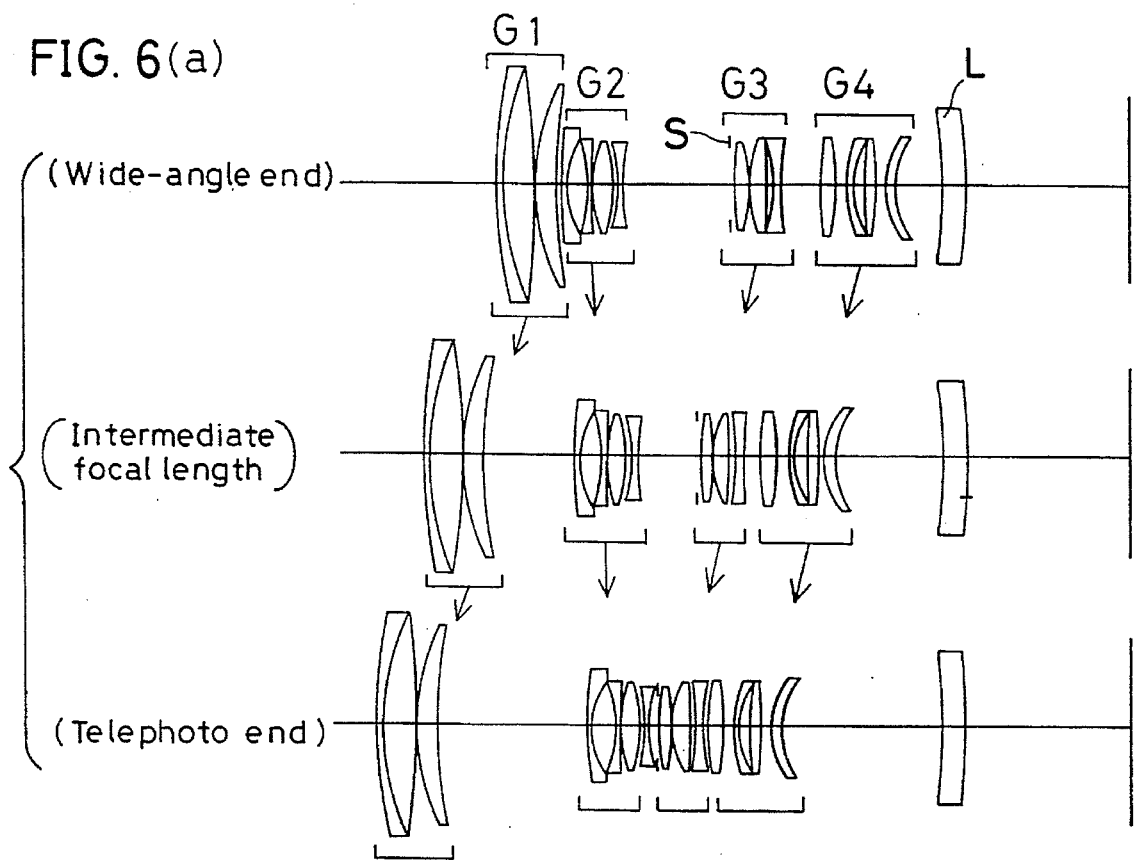
Figure 6B:
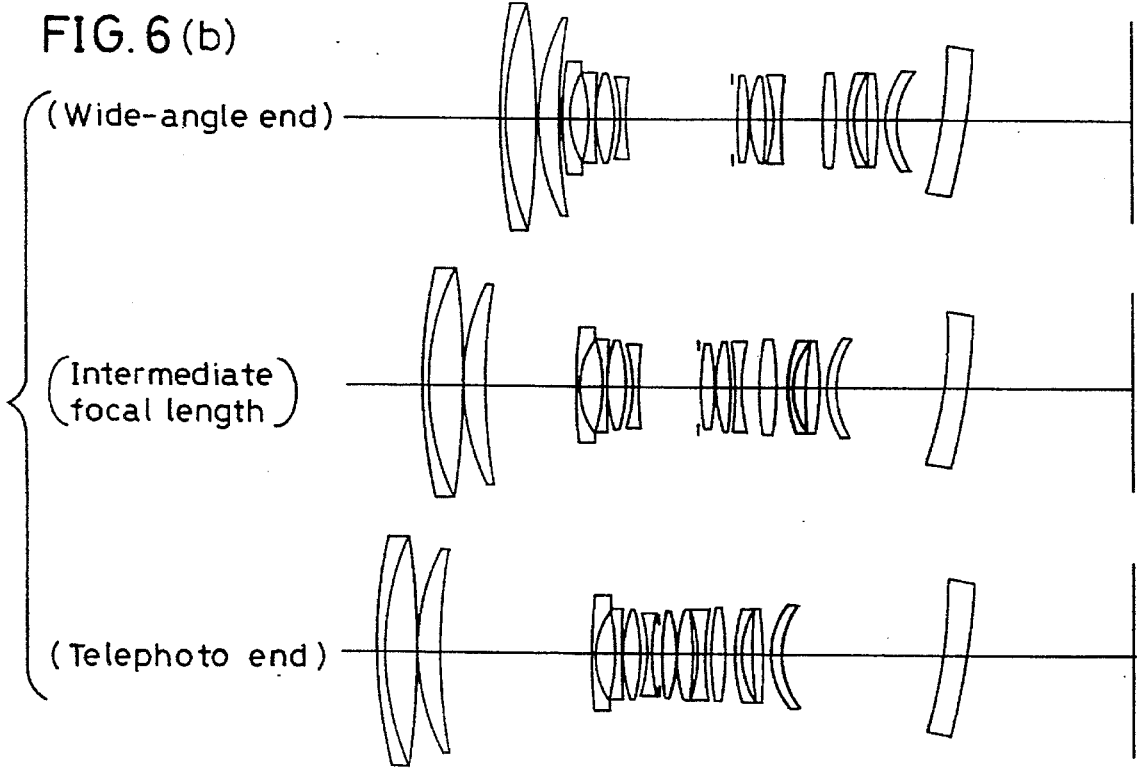
Figure 7A:
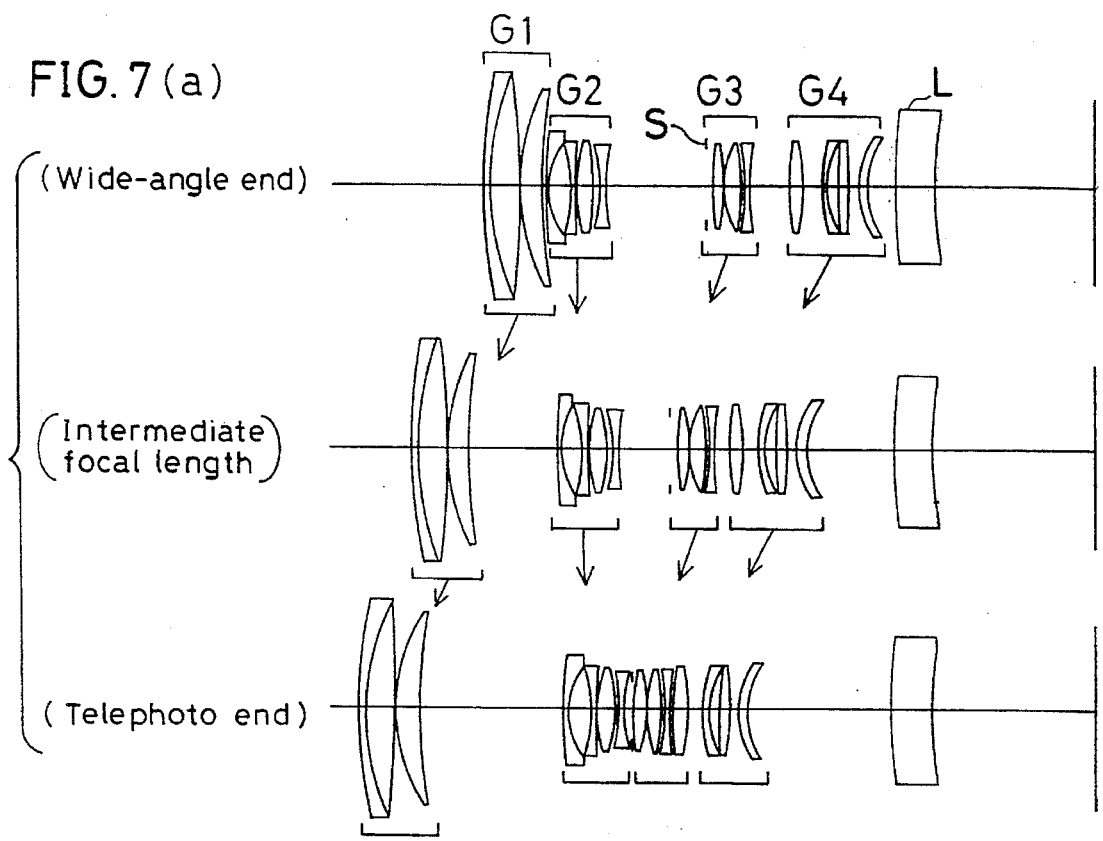
Figure 7B:
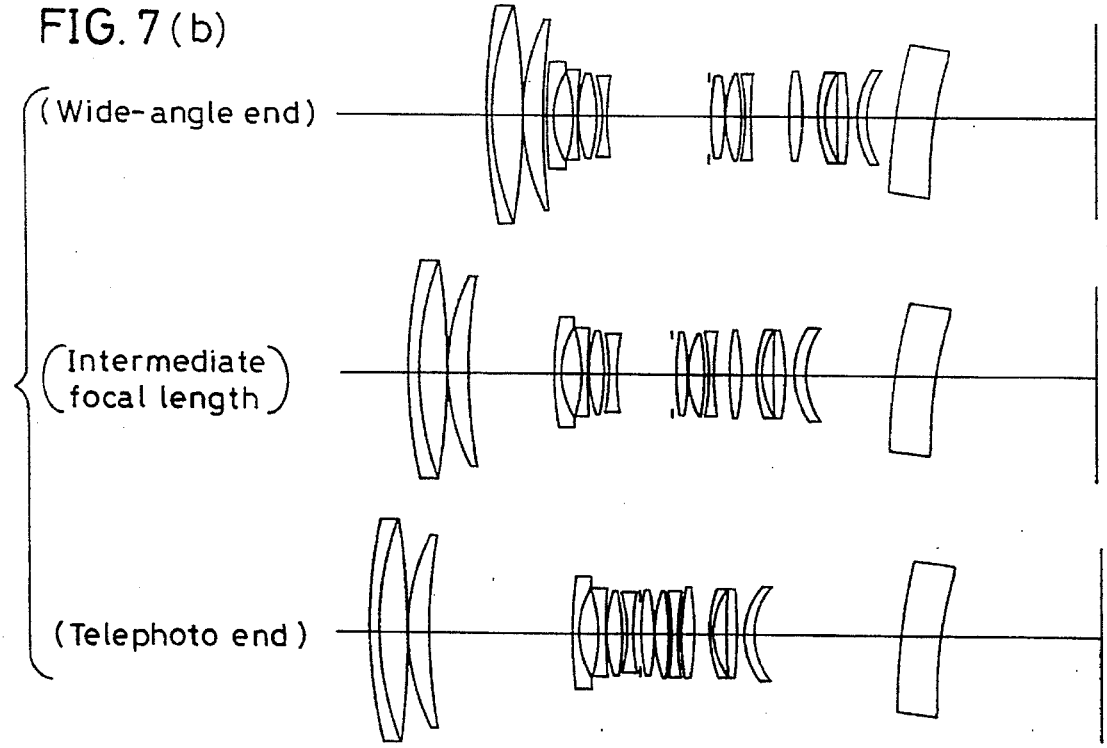
Figure 8A:
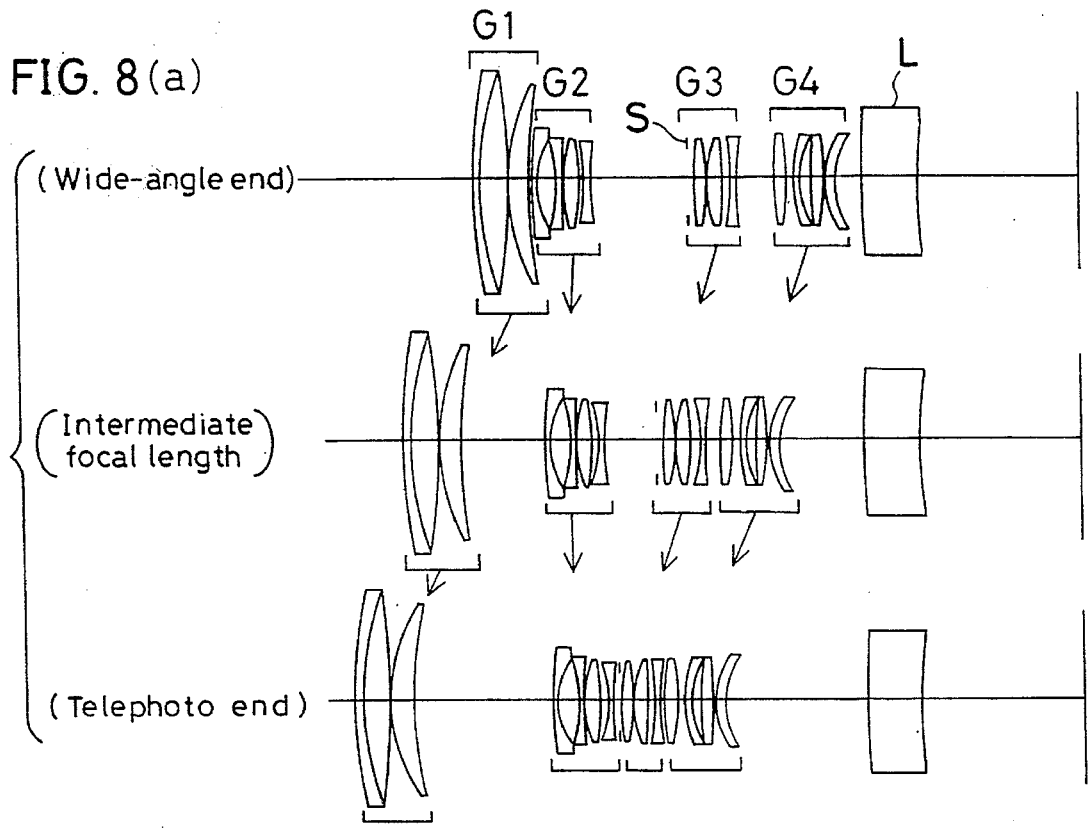
Figure 8B:
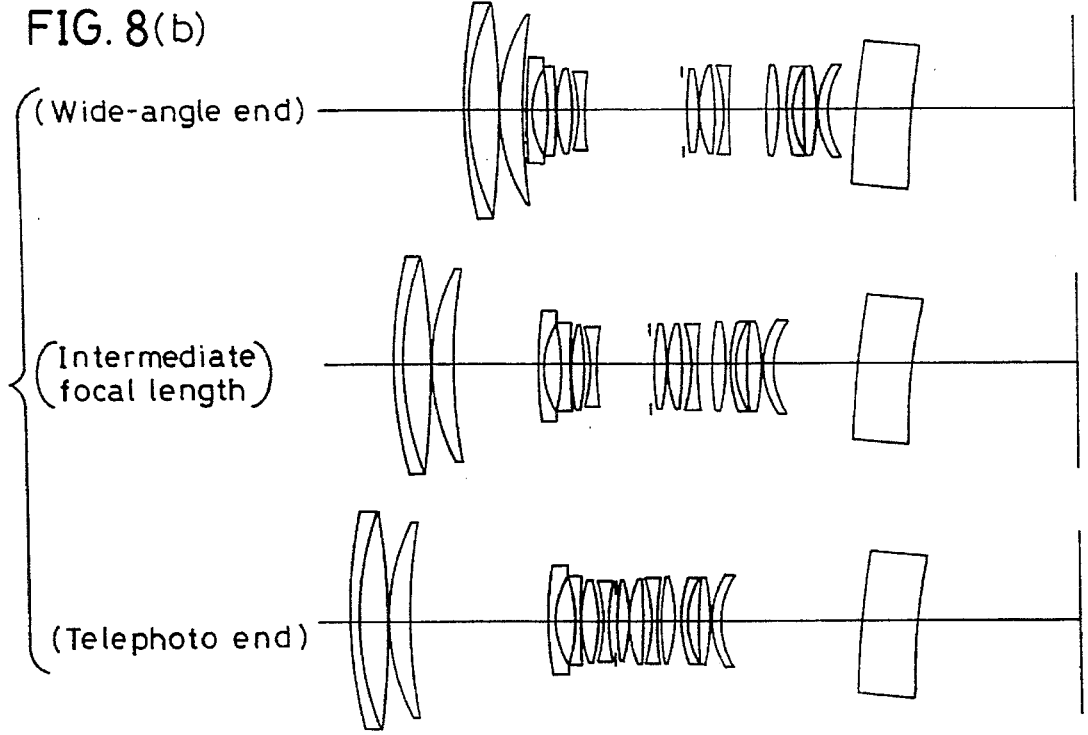
Figure 27:
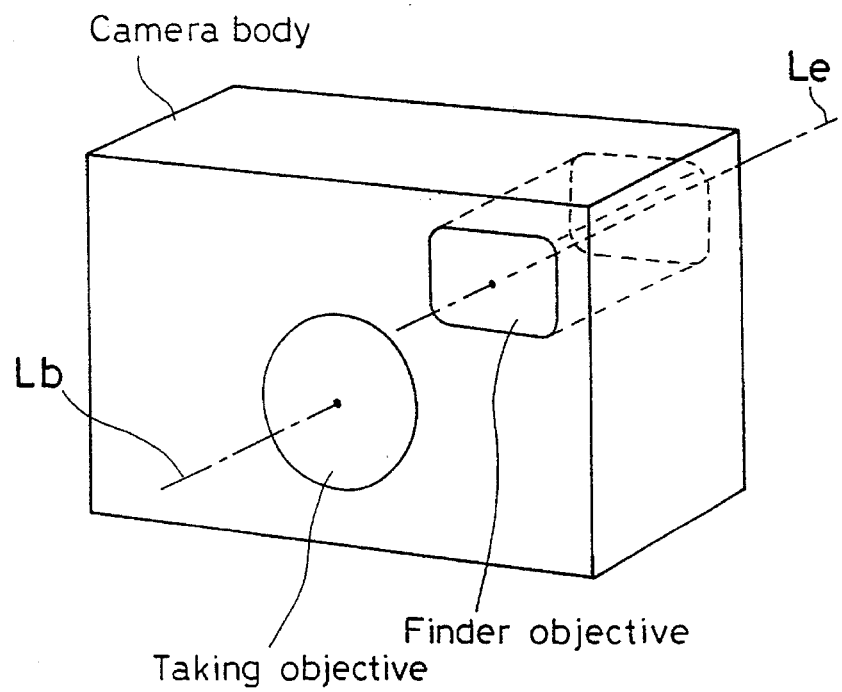
Figure 28:
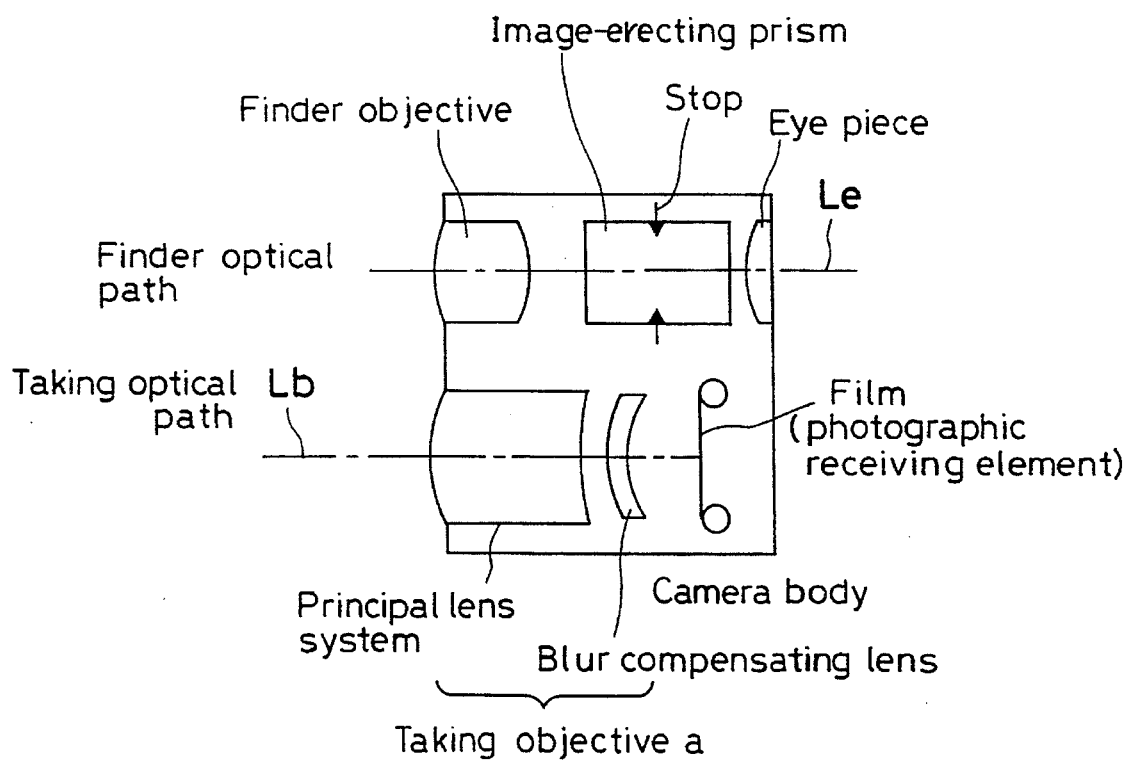
Figure 29:
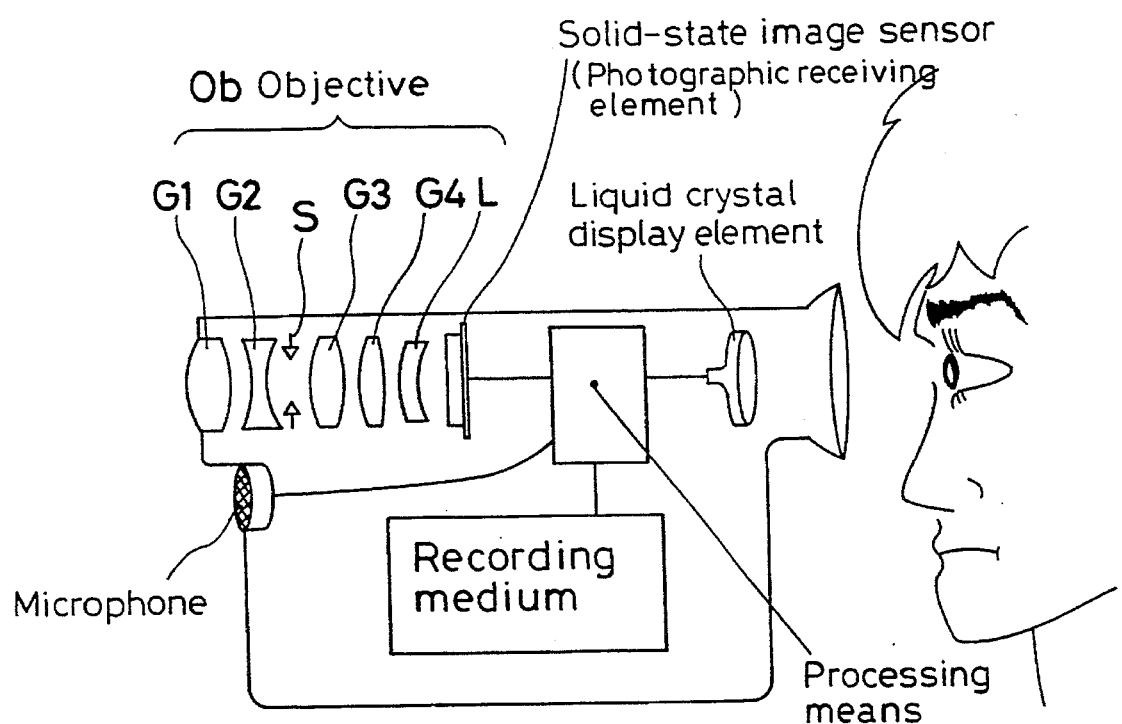
Figure 30:
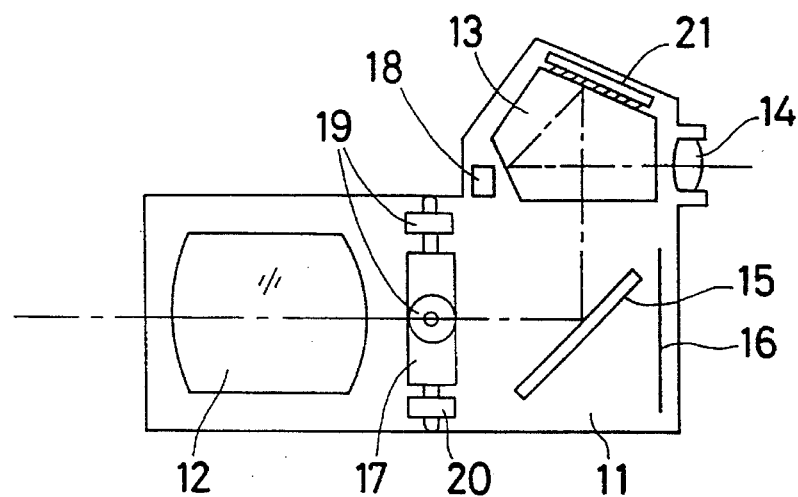
Figure 31:
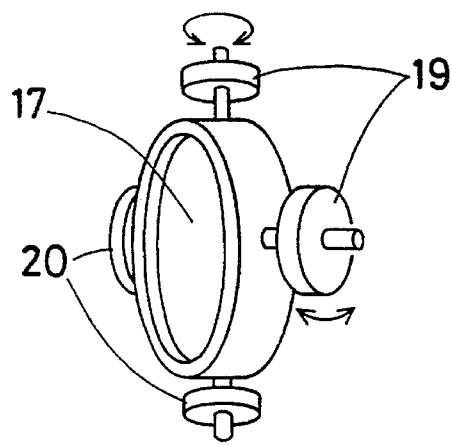
Figure 32:
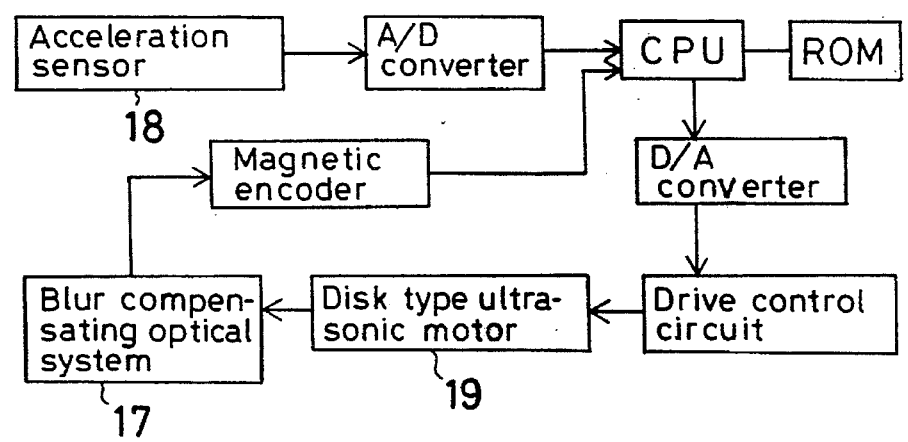

FIG. 3 a view that gives a definition of a point image blur induced by the vibration-proof optical system shown in FIG. 1;

FIG. 4 is a view that gives a definition of an image expansion and compression induced by the vibration-proof optical system shown in FIG. 1;

FIG. 5 is a view that provides an illustration of what arrangement optical elements are located in when one element thereof is inclined;

FIGS. 6(a) and 6(b) are a sectional views that show one typical lens arrangement of a prior design example;

FIGS. 7(a) and 7(b) are sectional views that show one typical lens arrangement of Example 1 of the vibration-proof optical system according to the present invention;

FIGS. 8(a) and 8(b) are sectional views that show one typical lens arrangement of Example 2 of the vibration-proof optical system according to the present invention;

FIGS. 9(a) to 9(d) are aberration diagrams of the prior design example at the wide-angle end when it is focused on the object point at infinity;

FIGS. 10(a) to 10(d) are aberration diagrams of the prior design example at an intermediate focal length when it is focused on the object point at infinity;

FIGS. 11(a) to 11(d) are aberration diagrams of the prior design example at the telephoto end when it is focused on the object point at infinity;

FIGS. 12(a) to 12(d) are aberration diagrams of the prior design example at the wide-angle end when it is focused on the object point at infinity with the blur compensating lens rotated;

FIGS. 13(a) to 13(d) are aberration diagrams of the prior design example at an intermediate focal length when it is focused on the object point at infinity with the blur compensating lens rotated;

FIGS. 14(a) to 14(d) are aberration diagrams of the prior design example at the telephoto end when it is focused on the object point at infinity with the blur compensating lens rotated;

FIGS. 15(a) to 15(d) are aberration diagrams of Example 1 corresponding to FIGS. 9(a) to 9(d);

FIGS. 16(a) to 16(d) are aberration diagrams of Example 1 corresponding to FIGS. 10(a) to 10(d);

FIGS. 17(a) to 17(d) are aberration diagrams of Example 1 corresponding to FIGS. 11(a) to 11(d);

FIGS. 18(a) to 18(d) are aberration diagrams of Example 1 corresponding to FIGS. 12(a) to 12(d);

FIGS. 19(a) to 19(d) are aberration diagrams of Example 1 corresponding to FIGS. 13(a) to 13(d);

FIGS. 20(a) to 20(d) are aberration diagrams of Example 1 similar to FIGS. 14(a) to 14(d);

FIGS. 21(a) to 21(d) are aberration diagrams of Example 2 corresponding to FIGS. 9(a) to 9(d);

FIGS. 22(a) to 22(d) are aberration diagrams of Example 2 corresponding to FIGS. 10(a) to 10(d);

FIGS. 23(a) to 23(d) are aberration diagrams of Example 2 corresponding to FIGS. 11(a) to 11(d);

FIGS. 24(a) to 24(d) are aberration diagrams of Example 2 corresponding to FIGS. 12(a) to 12(d);

FIGS. 25(a) to 25(d) are aberration diagrams of Example 2 corresponding to FIGS. 13(a) to 13(d);

FIGS. 26(a) to 26(d) are aberration diagram of Example 2 corresponding to FIGS. 14(a) and 14(d);

FIG. 27 is a perspective view of a compact camera in which the vibration-proof optical system of the present invention is built in;

FIG. 28 is a sectional view of a compact camera in which the vibration-proof optical system of the present invention is built in;

FIG. 29 is a schematic of the construction of a video camera system in which the vibration-proof optical system of the present invention is built in;

FIG. 30 is a schematic of the general construction of a single-lens reflex camera with which the blur compensating lens driving means according to the present invention is used;

FIG. 31 is a schematic of the construction of the blur compensating optical system portion shown in FIG. 30; and FIG. 32 is a schematic of the construction of the control system shown in FIG. 30.

BRIEF DESCRIPTION OF PREFERRED EMBODIMENTS

Reference will now be made to why the above-mentioned lens system design is used and how it works.

The vibration-proof optical system of the present invention will now be explained with reference to the schematic view of FIG. 1, in which reference numeral 1 represents the principal lens system, 2 a plane-parallel plate, and 3 an image position. As illustrated, the plane-parallel plate 2 is rotated around one point on the optical axis depending upon the amount of movement of the picture-taking system, whereby a variation of the image position 3 on the image-forming surface is compensated for to obtain a still image. The performance of the vibration-proof optical system of the present invention will now be explained at great length with reference to FIG. 1.

Upon the plane-parallel plate 2 rotated as shown in FIG. 1, many aberrations occur, although the system is free from aberrations prior to rotation. Since the system is asymmetric, these aberrations cannot be broken down into Seidel's five aberrations. However, they may prima facie be classified into two types, one that may be referred to as spatial aberrations which are introduced in the system by light rays not converging at one point or the image position moving in the optical axis direction, resulting in a blurred point image, and the other as temporal aberrations which are introduced in the system by a difference in the amount of movement of the image between the on-axis and the off-axis with the result that off-axis points form a line image even when still shots of on-axis points are taken.

In the present disclosure, the spatial aberrations are described as a "point image blur" represented by a spatial run-out between marginal rays and light rays, while the to temporal aberrations are described as an "image expansion and compression" represented by a difference in the amount of movement of the principal ray between the on-axis and the off-axis.

Figure 2:
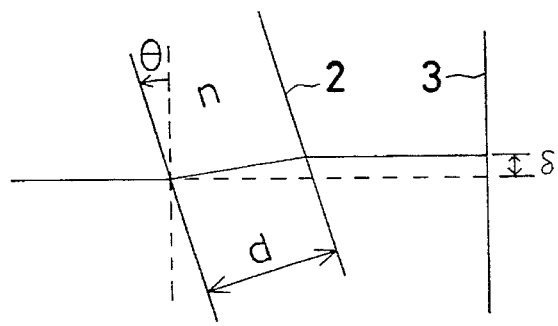
FIG. 2 is a view that gives a definition of the amount of movement of the optical axis induced by the inclination of the plane-parallel plate of the vibration-proof optical system shown in FIG. 1.

FIGS. 2–4 illustrate the plane-parallel plate 2 and image surface 3 of FIG. 1 on an enlarged scale, with FIG. 2 giving a definition of the amount δ of movement of the optical axis by the inclination of the plane-parallel plate 2, FIG. 3 a definition of a point image blur ΔP and FIG. 4 a definition of the image expansion and compression ΔI.

As can be seen from FIG. 2, when the plane-parallel plate 2 with the refractive index n and thickness d inclines from the vertical position at an angle of just θ with respect to the optical axis, it displaces by δ on the image surface 3. Making use of the variables d, θ and n, δ is then given by the following equation:

$$\delta = d\sin\theta(1 - \{\cos\theta / \sqrt{(n^2 - \sin^2\theta)}\})$$

When it is desired to compensate for the run-out amount δ of the picture image resulting from the inclination of the picture-taking optical system, the thickness d and refractive index n of the plane-parallel plate can be determined from the above-mentioned equation to find the proper value of the angle θ of inclination When the plane-parallel plate 2 inclines as shown in FIG. 3, the angle of incidence of a light ray parallel to the optical axis on the plane-parallel plate 2 becomes large (0→θ), but the angle of incidence of an axial upper marginal ray on the plane-parallel plate 2 becomes small. As a result, there is a difference in the magnitude of the change of refraction between the ray parallel to the optical axis and the marginal ray, so that the displacement of the axial ray becomes larger than that of the marginal ray. Consequently, the position where the axial ray intersects the marginal ray is located in the rear of the image surface, resulting in the blur ΔP. In this regard, let ΔPz represent the amount of displacement of the ray on the optical axis. Making use of the variables d, θ and n, ΔPz is then given by $$\Delta Pz = d((n-1)/\{\sqrt{(n^2 - \sin^2\theta)}\} + (1/n) - 1)$$

In principle, reference to FIG. 3 holds for FIG. 4, too. With the plane-parallel plate 2 inclined, there is a difference in magnitude between the displacement of the ray on the optical axis and the displacement of the off-axis principal ray on the image surface 3. Therefore, an object, which forms an image at an image height Io when the plane-parallel plate 2 is located vertically to the optical axis, forms an image at an image height I' if the plane-parallel plate 2 is inclined at an angle of just θ. Consequently, the image expansion and compression ΔI occur.

Thus, the plane-parallel plate 2 has much the same action on light rays parallel to the optical axis. However, since the plane-parallel plate 2 acts differently on rays having different angles of inclination, the above-mentioned "point image blur" and "image expansion and compression" occur.

In the present invention, a meniscus lens that is reduced in the amount of an aberration variation due to decentration and is concave on the image side is used in place of a plane-parallel plate. More specifically, the meniscus lens is located between the principal lens and the image surface, so that it can be designed to be rotated around one point on the optical axis. By use of this design it is possible to reduce the aberration variation after the rotation and thus reduce or substantially eliminate the above-mentioned "point image blur" or "image expansion and compression".

Referring here to the above-mentioned JP-A 3-141318, it proposes to use a meniscus lens that is convex on the image side (i.e., convex on the exit pupil of the principal lens system) instead of a plane-parallel plate. This meniscus lens is designed to be rotated around one point on the optical axis, thereby reducing the "point image blur" or "image expansion and compression".

To give an account of a superiority of the present invention over the vibration-proof optical system of JP-A-3-141318, how decentration aberrations manifest themselves will now be explained with reference to the method proposed by Yoshiya MATSUI at the 23rd workshop meeting of the Applied Physical Society (1962). See, Yoshiya MATSUI, JOEM Text "THEORY OF THIRD-ORDER ABERRATIONS OF OPTICAL SYSTEMS IN WHICH DECENTRATION EXISTS", published by the Japan Opto-Mechatronics Society Corp., (1990).

Here consider the case where, as shown in FIG. 5, an element of an optical system is inclined at an angle of just ε around one point C on the optical axis. An aberration amount ΔY1 of the whole system becomes the sum of an aberration amount ΔY before decentration and an aberration amount ΔY(ε) introduced therein by decentration, as can be given by Eq. (a). Then, the aberration amount ΔY is given by Eq. (b) where I is spherical aberration, II is coma, III is astigmatism, P is Petzval sum, and V is distortion. Letters q and q' in FIG. 5 represent the distances from the point C to the object and image surfaces, respectively.

As given by Eq. (c), the decentration aberrations Δ(Yε) are represented by first-order decentration coma (IIE), first-order decentration astigmatism (IIIE), first-order decentration curvature of field (PE), first-order decentration distortion (VE1), first-order decentration added distortion (VE2), and first-order point-of-origin movement (ΔE).

Here consider a zooming optical system in which an image blur compensating lens is designed to be rotated at an angle of just ε around one point on the optical axis and let α and <α> denote angles that axial and off-axis principal rays incident on the image blur compensating lens make with the optical axis. The aberrations (ΔE) to (VE2) given by Eqs. (d) to (i) are represented by aberration coefficients I, II, III, P and V of the final lens unit. In the following equations, ω is the angle that a straight line connecting the object point with the object-side principal point makes with the reference (optical) axis, φW is the azimuth angle of ω, R is the radius of the entrance pupil as measured on the object-side principal plane of the optical system φR is the azimuth angle of R, α' and <α'>are the angles that the axial ray and off-axial principal ray on the image field side make with the optical axis, and N and N' are the indices of refraction of the object and image fields, respectively.

$$\Delta Y1 = \Delta Y + \Delta Y(\epsilon) \tag{a}$$

$$\Delta Y = -(\epsilon/2\alpha)\ [(N \tan\omega)^3 \cos\phi_W \cdot V + \tag{b}$$
$$R(N \tan\omega)^2 \{2 \cos\phi_W \cos(\phi_R - \phi_W) + \cos\phi_R\ (III + P)\} +$$
$$R^2(N \tan\omega)\{2 \cos\phi_R \cos(\phi_R - \phi_W) + \cos\phi_W\} \cdot II + R^3 \cos\phi_R \cdot I]$$

$$\Delta Y(\epsilon) = -(\epsilon/2\alpha)\{(\Delta E) + (N \tan\omega)^2 (2 + \cos\phi_W)\ (VE1) - (VE2) + \tag{c}$$
$$2R(N \tan\omega)\{(2 \cos(\phi_R - \phi_W) + \cos(\phi_R + \phi_W)) \cdot (IIIE) +$$
$$\cos\phi_R \cos\phi_W \cdot (PE)\} + R^2(2 + \cos2\phi_R) \cdot (IIE)]$$

$$(\Delta E) = -2(\alpha' q' - \alpha q) \tag{d}$$

$$(IIE) = -\alpha q II + <\alpha> q I \tag{e}$$

$$(IIIE) = -\alpha q III + <\alpha> q II \tag{f}$$

$$(PE) = -\alpha q P + \{(\alpha'/N') - (\alpha/N)\} \tag{g}$$

$$(VEI) = -\alpha q V + <\alpha> q III + \{(<\alpha'>/pN') - (<\alpha>/N)\} \tag{h}$$

$$VE2) = -<\alpha> q P + \{>\alpha'>/N') - (<\alpha>/N)\} \tag{i}$$

From the above equations, it is found that to reduce the decentration aberrations, the values of the aberration coefficients I, II, III, P and V of the image blur compensating lens must be reduced, or alternatively they must be so well balanced that they can offset each other.

To achieve this in the present invention, the image blur compensating lens is designed such that its decentration aberration coefficients are reduced irrespective of the design of the principal lens system located on the object side farther off the image blur compensating lens to inhibit the occurrence of the "point image blur" or "image expansion and compression", so that the ability to form images can improved during movement of the picture-taking system.

Set out in Tables 1, 2 and 3 are the decentration aberration coefficients (ΔE), (IIE), (IIIE) and (PE) of the image blur compensating lenses according to Example 1 (that will be described in detail) and a prior design example (that will be described in detail) of JP-A 3-141318. By comparing these data it is found that the present invention is superior over the prior art.

TABLE 1

| Blue Compensating Lens | | |
|---|---|---|
| | Example 1 of the Invention | JP-A 3-141318 |
| (ΔE) | −0.19828 | −0.19735 |
| (IIE) | −0.07181 | −0.28958 |
| (IIIE) | 0.00592 | 0.02668 |
| (PE) | 0.01382 | −0.03100 |

TABLE 2

| Blue Compensating Lens | | |
|---|---|---|
| | Example 1 of the Invention | JP-A 3-141318 |
| (ΔE) | −0.08729 | −0.08688 |
| (IIE) | −0.03161 | −0.12749 |
| (IIIE) | 0.00383 | 0.02011 |
| (PE) | 0.01382 | −0.03100 |

TABLE 3

| Blue Compensating Lens | | |
|---|---|---|
| | Example 1 of the Invention | JP-A 3-141318 |
| (ΔE) | −0.03722 | −0.03705 |
| (IIE) | −0.01348 | −0.05436 |
| (IIIE) | 0.00139 | 0.01132 |
| (PE) | 0.01382 | −0.03100 |

In these picture-taking optical systems, however, a zooming optical system the aberrations of which are corrected according to the same specification (focal length, and F-number) is used. The picture-taking optical systems are also designed such that the amount of an image blur caused by their inclination is 0.5 mm, the then angle of rotation of the image blur compensating lens is 8°, and the point of intersection of the lens surface of the image blur compensating lens proximate to the object side with the optical axis is the center around which the blur compensating lens is rotated.

Tables 1, 2 and 3 mentioned above show the decentration aberration coefficients as measured when the wide-angle, intermediate, and telephoto focal lengths are standardized at 1. FIGS. 6(a) and 6(b) illustrate a sectional lens arrangement of the prior design example mentioned above, and FIGS. 7(a) and 7(b) shows a sectional lens arrangement of Example 1 according to the present invention. In each of FIGS. 6(a), 6(b), 7(a) and 7(b), the optical system is shown at the wide-angle ends, intermediate focal lengths and telephoto ends before (FIGS. 6(a) and 6(b)) and after decentration (FIGS. 7(a) and 7(b)). G1 is the first lens unit, G2 the second lens unit, G3 the third lens unit, G4 the fourth lens unit, S the aperture stop, L the blur compensating lens. FIGS. 9(a) to 9(d), 10(a) to 10(d), and 11(a) to 11(d) are aberration diagrams of the prior design example at the wide-angle end, an intermediate focal length and telephoto end, and FIGS. 12(a) to 12(d), 13(a) to 13(d), and 14(a) to 14(d) are similar aberration diagrams of the prior design example with the blur compensating lens L rotated, while FIGS. 15(a) to 15(d), 16(a) to 16(d), and 17(a) to 17(d) are similar aberration diagrams of Example 1 of the present invention, and FIGS. 18(a) to 18(d), 19(a) to 19(d), and 20(a) to 20(d) are similar aberration diagrams of Example 1 with the blur compensating lens L rotated.

The aberrations of the prior design example free from any image blur (see FIGS. 9(a)–11(d)) are substantially equivalent to those of Example 1 again free from any image blur (see FIGS. 15(a)17(d)). As can be understood from Tables 1–3, however, Example 1 of the present invention can be more reduced in the decentration aberration coefficients of the blur compensating lens L than the prior design example. As can be seen from a comparison between FIGS. 12(a) to 14(d) and FIGS. 18(a) to 20(d), therefore, Example 1 can be more reduced than the prior design example in terms of the amount of spherical aberration and astigmatism run-outs with respect to the image surface in the presence of an image blur. It is thus possible to make deterioration of the ability to form images in the presence of an image blur smaller than would be possible with the prior design example.

Furthermore in the present invention, the decentration aberration coefficients can be reduced irrespective of where the center of rotation of the image blur compensating lens is located. It is thus possible to reduce deterioration of the ability of the image blur compensating lens to form images in the presence of some image blur irrespective of where the center of its rotation is located.

To make satisfactory correction of the aberrations of the image blur compensating lens L according to the present invention and thereby keep the whole aberrations of the picture-taking optical system in a well-balanced state, it is desired that the following conditions be satisfied:

$$0.9 < \beta_1 < 1.1 \quad (1)$$

$$0.05 < |(R_1 - R_2)/(R_1 + R_2)| < 0.5 \quad (2)$$

$$0.23 \times 10^{-3} < (d/D)((n-1)/\{\sqrt{(n^2 - \sin^2\theta)} + (1/n) - 1\}) < 2.31 \times 10^{-3} \quad (3)$$

Here $\beta_1$ is the paraxial lateral magnification of the meniscus lens L constituting the image blur compensating lens, $R_1$ and $R_2$ are the radii of curvature of the entrance and exit surfaces of the meniscus lens L, respectively, D is a half of the diagonal length of the image surface, and d, n and θ are the thickness, index of refraction and angle of rotation of the meniscus lens L, respectively.

The above condition (1) gives a definition of the paraxial lateral magnification of the image blur compensating lens L. Any departure of both the lower limit of 0.9 and the upper limit of 1.1 is not preferable, because as the lens L rotated, its aberration variation is increased.

The above condition (2) gives a definition of the shape of the image blur compensating lens L. A departure from the lower limit of 0.05 is not preferable, because as the lens L rotated, its aberration variation is increased. When the upper limit of 0.5 is exceeded, the refracting power of the lens L is increased as well. In particular, the astigmatism and distortion of the lens L are increased too much to keep all aberrations of the picture-taking optical system in a well-balanced state.

To predict the post-decentration aberration variation from three parameters of the image blur compensating lens L or its angle θ of rotation, its index n of refraction and its thickness d to obtain an index to optical design, it is preferable that the amount (the above-mentioned $\Delta P_2$) of displacement of the ray on the optical axis lies in the range defined by condition (3), provided that the image blur compensating lens L is considered as being a plane-parallel plate. By conforming to condition (3) it is possible to make the ability of the picture-taking optical system form satisfactory images even in the presence of some image blur. In the matter of the image blur compensating lens L, its index n of refraction and its thickness d can be properly determined at a small angle θ of rotation while the amount of an image blur caused by the inclination of the picture-taking optical system is kept constant.

To optimize the shape of the image blur compensating lens L and make the ability of the picture-taking optical system to form satisfactory images even in the presence of some image blur, it is preferable that conditions (2) and (3) reduce to the following conditions (4) and (5):

$$0.05 < |(R_1 - R_2)/(R_1 + R_2)| < 0.4 \quad (4)$$

$$0.23 \times 10^{-3} < (d/D)((n-1)/\{\sqrt{(n^2 - \sin^2\theta)}\} + (1/n) - 1) < 1.5 \times 10^{-3} \quad (5)$$

Since the center of rotation of the image blur compensating lens L is fixed with respect to the image surface, it is possible to compensate for an image blur with a simplified mechanism and to achieve rapid correction of an image blur with no size increase.

PRIOR DESIGN EXAMPLE

A zooming optical system according to the prior design example, numerical data about which will be enumerated later, comprises in order from the object side a first lens unit G1 of positive refracting power, a second lens unit G2 of negative refracting power, a third lens unit G3 of positive refractive power, a fourth lens unit G4 of positive refracting power and a negative meniscus lens convex on the image side, as can be seen from the sectional views of FIGS. 6(a) and 6(b). For zooming from the wide-angle end to the telephoto end, the first, third and fourth lens units G1, G3 and G4 are moved toward the objet side while the second lens unit G2 is moved toward the image side. For correction of an image blur, the meniscus lens L is rotated around the point of intersection of its entrance surface with the optical axis. The blurring of the image, which occurs by the inclination of the picture-taking optical system, is assumed to be 0.5 mm, and the then angle of rotation of the lens L is assumed to be 8° for compensating for that blurring.

EXAMPLE 1

A zooming optical system according to Example 1 of the present invention comprises in order from the object side a first lens unit G1 of positive refracting power, a second lens unit G2 of negative refracting power, a third lens unit G3 of positive refractive power, a fourth lens unit G4 of positive refracting power and a negative meniscus lens concave on the image side, as can be seen from the sectional views of FIGS. 7(a) and 7(b). For zooming from the wide-angle end to telephoto end, the first, third and fourth lens units G1, G3 and G4 are moved toward the objet side while the second lens unit G2 is moved toward the image side. For correction of an image blur, the meniscus lens L is rotated around the point of intersection of its entrance surface with the optical axis. The blurring of the image, which occurs by the inclination of the picture-taking optical system, is assumed to be 0.5 mm, and the then angle of rotation of the lens L is assumed to be 8° for compensating that blurring.

EXAMPLE 2

A zooming optical system according to Example 2 comprises in order from the object side a first lens unit G1 of positive refracting power, a second lens unit G2 of negative refracting power, a third lens unit G3 of positive refractive power, a fourth lens unit G4 of positive refracting power and a negative meniscus lens concave on the image side, as can be seen from the sectional views of FIGS. 8(a) and 8(b). For zooming from the wide-angle end to telephoto end, the first, third and fourth lens units G1, G3 and G4 are moved toward the object side while the second lens unit G2 is moved toward the image side. For correction of an image blur, the meniscus lens L is rotated around the point of intersection of its entrance surface with the optical axis. The blurring of the image, which occurs by the inclination of the picture-taking optical system, is assumed to be 0.5 mm, and the then angle of rotation of the lens L is assumed to be 5° for compensating for that blurring.

Enumerated below are numerical data about the prior design example and Examples 1 and 2 of the present invention. The symbols used hereinafter but not hereinbefore are f=the focal length of the entire system, $F_{NO}$=the F-number, $2\omega$ is the field angle, $r_1, r_2, \ldots$ =the radius of curvature of each surface of a lens, $d_1, d_2, \ldots$ =the space between adjacent lenses, $n_{d1}, n_{d2}, \ldots$ =the d-line index of refraction of each lens, and $v_{d1}, v_{d2}, \ldots$ =the Abbe number of each lens.

PRIOR DESIGN EXAMPLE f = 36.1~82.0~192.3
$F_{NO}$ = 4.3~5.0~5.6
$2\omega$ = 61.86°~29.55°~12.84°

| | | | |
|---|---|---|---|
| $r_1$ = 118.4762 | $d_1$ = 1.200 | $n_{d1}$ = 1.80518 | $v_{d1}$ = 25.43 |
| $r_2$ = 63.5264 | $d_2$ = 7.500 | $n_{d2}$ = 1.49700 | $v_{d2}$ = 81.61 |
| $r_3$ = −298.9257 | $d_3$ = 0.200 | | |
| $r_4$ = 45.3712 | $d_4$ = 5.645 | $n_{d3}$ = 1.61700 | $v_{d3}$ = 62.79 |
| $r_5$ = 118.7164 | $d_5$ = (Variable) | | |
| $r_6$ = 88.5311 | $d_6$ = 1.200 | $n_{d4}$ = 1.80400 | $v_{d4}$ = 46.57 |
| $r_7$ = 17.8729 | $d_7$ = 5.711 | | |
| $r_8$ = −36.8519 | $d_8$ = 1.200 | $n_{d5}$ = 1.77250 | $v_{d5}$ = 49.66 |
| $r_9$ = 482.4223 | $d_9$ = 0.200 | | |
| $r_{10}$ = 34.0995 | $d_{10}$ = 4.563 | $n_{d6}$ = 1.80518 | $v_{d6}$ = 25.43 |
| $r_{11}$ = −46.6526 | $d_{11}$ = 1.572 | | |
| $r_{12}$ = −32.2022 | $d_{12}$ = 1.200 | $n_{d7}$ = 1.77250 | $v_{d7}$ = 49.66 |
| $r_{13}$ = 89.4593 | $d_{13}$ = (Variable) | | |
| $r_{14}$ = ∞ (Stop) | $d_{14}$ = 1.000 | | |
| $r_{15}$ = 89.3633 | $d_{15}$ = 3.045 | $n_{d8}$ = 1.71300 | $v_{d8}$ = 53.84 |
| $r_{16}$ = −70.7554 | $d_{16}$ = 0.200 | | |
| $r_{17}$ = 28.7598 | $d_{17}$ = 4.163 | $n_{d9}$ = 1.50378 | $v_{d9}$ = 66.81 |
| $r_{18}$ = −110.4685 | $d_{18}$ = 1.418 | | |
| $r_{19}$ = −49.2476 | $d_{19}$ = 1.820 | $n_{d10}$ = 1.80518 | $v_{d10}$ = 25.43 |
| $r_{20}$ = 104.0668 | $d_{20}$ = (Variable) | | |
| $r_{21}$ = 104.3552 | $d_{21}$ = 4.063 | $n_{d11}$ = 1.74000 | $v_{d11}$ = 28.29 |
| $r_{22}$ = −71.7427 | $d_{22}$ = 2.646 | | |
| $r_{23}$ = 33.1108 | $d_{23}$ = 1.200 | $n_{d12}$ = 1.80518 | $v_{d12}$ = 25.43 |
| $r_{24}$ = 19.7250 | $d_{24}$ = 2.686 | | |
| $r_{25}$ = 82.4287 | $d_{25}$ = 2.984 | $n_{d13}$ = 1.48749 | $v_{d13}$ = 70.20 |
| $r_{26}$ = −144.2658 | $d_{26}$ = 2.019 | | |
| $r_{27}$ = 19.4733 | $d_{27}$ = 2.419 | $n_{d14}$ = 1.53996 | $v_{d14}$ = 59.57 |
| $r_{28}$ = 20.9557 | $d_{28}$ = (Variable) | | |
| $r_{29}$ = −131.5403 | $d_{29}$ = 6.000 | $n_{d15}$ = 1.88300 | $v_{d15}$ = 40.78 |
| $r_{30}$ = −150.3102 | | | |

Zooming Spaces

| f | 36.1 | 82.0 | 192.3 |
|---|---|---|---|
| $d_5$ | 1.0000 | 22.3558 | 37.1280 |
| $d_{13}$ | 26.0997 | 14.3102 | 1.0000 |
| $d_{20}$ | 9.6557 | 4.0029 | 1.0489 |
| $d_{28}$ | 10.8680 | 25.4772 | 38.2818 |

EXAMPLE 1 f = 36.1~82.0~192.3
$F_{NO}$ = 4.3~5.0~5.6
$2\omega$ = 61.86°~29.56°~12.84°

| | | | |
|---|---|---|---|
| $r_1$ = 118.4094 | $d_1$ = 1.200 | $n_{d1}$ = 1.80518 | $v_{d1}$ = 25.43 |
| $r_2$ = 63.6333 | $d_2$ = 7.500 | $n_{d2}$ = 1.49700 | $v_{d2}$ = 81.61 |

-continued $$f = 36.1\text{~}82.0\text{~}192.3$$
$$F_{NO} = 4.3\text{~}5.0\text{~}5.6$$
$$2\omega = 61.86°\text{~}29.56°\text{~}12.84°$$

| | | | |
|---|---|---|---|
| $r_3 = -297.8087$ | $d_3 = 0.200$ | | |
| $r_4 = 45.1987$ | $d_4 = 5.652$ | $n_{d3} = 1.61700$ | $v_{d3} = 62.79$ |
| $r_5 = 118.4849$ | $d_5 = $ (Variable) | | |
| $r_6 = 87.9833$ | $d_6 = 1.200$ | $n_{d4} = 1.80400$ | $v_{d4} = 46.57$ |
| $r_7 = 17.9732$ | $d_7 = 5.848$ | | |
| $r_8 = -36.3150$ | $d_8 = 1.200$ | $n_{d5} = 1.77250$ | $v_{d5} = 49.66$ |
| $r_9 = 739.2518$ | $d_9 = 0.200$ | | |
| $r_{10} = 33.8963$ | $d_{10} = 4.528$ | $n_{d6} = 1.80518$ | $v_{d6} = 25.43$ |
| $r_{11} = -46.9633$ | $d_{11} = 1.457$ | | |
| $r_{12} = -32.6297$ | $d_{12} = 1.200$ | $n_{d7} = 1.77250$ | $v_{d7} = 49.66$ |
| $r_{13} = 80.5582$ | $d_{13} = $ (Variable) | | |
| $r_{14} = \infty$ (Stop) | $d_{14} = 1.000$ | | |
| $r_{15} = 94.4482$ | $d_{15} = 2.990$ | $n_{d8} = 1.71300$ | $v_{d8} = 53.84$ |
| $r_{16} = -72.5901$ | $d_{16} = 0.200$ | | |
| $r_{17} = 29.1466$ | $d_{17} = 3.975$ | $n_{d9} = 1.50378$ | $v_{d9} = 66.81$ |
| $r_{18} = -96.2646$ | $d_{18} = 1.044$ | | |
| $r_{19} = -48.1540$ | $d_{19} = 1.200$ | $n_{d10} = 1.80518$ | $v_{d10} = 25.43$ |
| $r_{20} = 123.8118$ | $d_{20} = $ (Variable) | | |
| $r_{21} = 111.9918$ | $d_{21} = 3.172$ | $n_{d11} = 1.74000$ | $v_{d11} = 28.29$ |
| $r_{22} = -73.3049$ | $d_{22} = 4.012$ | | |
| $r_{23} = 33.5463$ | $d_{23} = 1.200$ | $n_{d12} = 1.80518$ | $v_{d12} = 25.43$ |
| $r_{24} = 19.8208$ | $d_{24} = 2.584$ | | |
| $r_{25} = 79.3901$ | $d_{25} = 2.978$ | $n_{d13} = 1.48749$ | $v_{d13} = 70.20$ |
| $r_{26} = -152.9729$ | $d_{26} = 2.320$ | | |
| $r_{27} = 19.4257$ | $d_{27} = 2.394$ | $n_{d14} = 1.53996$ | $v_{d14} = 59.57$ |
| $r_{28} = 20.7191$ | $d_{28} = $ (Variable) | | |
| $r_{29} = -222.3984$ | $d_{29} = 10.000$ | $n_{d15} = 1.83481$ | $v_{d15} = 42.72$ |
| $r_{30} = 187.4712$ | | | |

| Zooming Spaces | | | |
|---|---|---|---|
| f | 36.1 | 82.0 | 192.3 |
| $d_5$ | 1.0000 | 22.2337 | 36.9034 |
| $d_{13}$ | 25.7115 | 14.2204 | 1.0000 |
| $d_{20}$ | 9.7906 | 4.0221 | 1.0000 |
| $d_{28}$ | 7.0000 | 22.2692 | 35.5852 |

Condition (1) = 1.041
Condition (2) = 0.085
Condition (3) = 0.284

EXAMPLE 2

$$f = 36.1\text{~}82.0\text{~}192.3$$
$$F_{NO} = 4.3\text{~}5.0\text{~}5.6$$
$$2\omega = 61.86°\text{~}29.55°\text{~}12.84°$$

| | | | |
|---|---|---|---|
| $r_1 = 114.6294$ | $d_1 = 1.200$ | $n_{d1} = 1.80518$ | $v_{d1} = 25.43$ |
| $r_2 = 62.2555$ | $d_2 = 7.500$ | $n_{d2} = 1.49700$ | $v_{d2} = 81.61$ |
| $r_3 = -274.6913$ | $d_3 = 0.200$ | | |
| $r_4 = 43.4680$ | $d_4 = 5.565$ | $n_{d3} = 1.61700$ | $v_{d3} = 62.79$ |
| $r_5 = 103.3114$ | $d_5 = $ (Variable) | | |
| $r_6 = 93.3830$ | $d_6 = 1.200$ | $n_{d4} = 1.80400$ | $v_{d4} = 46.57$ |
| $r_7 = 17.7236$ | $d_7 = 5.486$ | | |
| $r_8 = -37.0482$ | $d_8 = 1.200$ | $n_{d5} = 1.77250$ | $v_{d5} = 49.66$ |
| $r_9 = 424.6706$ | $d_9 = 0.200$ | | |
| $r_{10} = 33.4254$ | $d_{10} = 4.531$ | $n_{d6} = 1.80518$ | $v_{d6} = 25.43$ |
| $r_{11} = -46.5411$ | $d_{11} = 1.413$ | | |
| $r_{12} = -32.3405$ | $d_{12} = 1.200$ | $n_{d7} = 1.77250$ | $v_{d7} = 49.66$ |
| $r_{13} = 83.1980$ | $d_{13} = $ (Variable) | | |
| $r_{14} = \infty$ (Stop) | $d_{14} = 1.000$ | | |
| $r_{15} = 83.8515$ | $d_{15} = 3.0234$ | $n_{d8} = 1.71300$ | $v_{d8} = 53.84$ |
| $r_{16} = -75.6075$ | $d_{16} = 0.200$ | | |
| $r_{17} = 28.5760$ | $d_{17} = 3.908$ | $n_{d9} = 1.50378$ | $v_{d9} = 66.81$ |
| $r_{18} = -123.5224$ | $d_{18} = 2.176$ | | |
| $r_{19} = -46.4350$ | $d_{19} = 1.200$ | $n_{d10} = 1.80518$ | $v_{d10} = 25.43$ |
| $r_{20} = 129.9594$ | $d_{20} = $ (Variable) | | |
| $r_{21} = 97.5200$ | $d_{21} = 3.333$ | $n_{d11} = 1.74000$ | $v_{d11} = 28.29$ |
| $r_{22} = -69.2242$ | $d_{22} = 1.585$ | | |
| $r_{23} = 34.1597$ | $d_{23} = 1.200$ | $n_{d12} = 1.80518$ | $v_{d12} = 25.43$ |
| $r_{24} = 19.3285$ | $d_{24} = 2.717$ | | |
| $r_{25} = 82.7786$ | $d_{25} = 3.070$ | $n_{d13} = 1.48749$ | $v_{d13} = 70.20$ |

-continued $$f = 36.1\text{~}82.0\text{~}192.3$$
$$F_{NO} = 4.3\text{~}5.0\text{~}5.6$$
$$2\omega = 61.86°\text{~}29.55°\text{~}12.84°$$

| | | | |
|---|---|---|---|
| $r_{26} = -122.8171$ | $d_{26} = 0.729$ | | |
| $r_{27} = 18.9702$ | $d_{27} = 2.492$ | $n_{d14} = 1.53996$ | $v_{d14} = 59.57$ |
| $r_{28} = 20.6302$ | $d_{28} = $ (Variable) | | |
| $r_{29} = 585.3164$ | $d_{29} = 14.000$ | $n_{d15} = 1.88300$ | $v_{d15} = 40.78$ |
| $r_{30} = 311.1316$ | | | |

| Zooming Spaces | | | |
|---|---|---|---|
| f | 36.1 | 82.0 | 192.3 |
| $d_5$ | 1.0000 | 22.3493 | 36.5293 |
| $d_{13}$ | 25.1957 | 13.9273 | 1.0000 |
| $d_{20}$ | 9.6206 | 4.1337 | 1.0000 |
| $d_{28}$ | 7.0000 | 21.2612 | 35.1912 |

Condition (1) = 1.050
Condition (2) = 0.306
Condition (3) = 0.152

FIGS. 9(a)–9(d), 10(a)–10(d) and 11(a)–11(d) are aberration diagrams of the prior design example at the wide-angle, intermediate focal length and telephoto end, FIGS. 12(a)–12(d), 13(a)–13(d) and 14(a)–14(d) are similar diagrams of the prior design example upon rotation of the blur compensating lens, FIGS. 15(a)–15(d), 16(a)–16(d) and 17(a)–17(d) are aberration diagrams of Example 1 similar to those of FIGS. 9(a)–9(d), 10(a)–10(d) and 11(a)–11(d), FIGS. 18(a)–18(d), 19(a)–19(d) and 20(a)–20(d) are similar aberration diagrams of Example 1 similar to those of FIGS. 12(a)–12(d), 13(a)–13(d) and 14(a)–14(d), FIGS. 21(a)–21(d), 22(a)–22(d) and 23(a)–23(d) are aberration diagrams of Example 2 similar to those of FIGS. 9(a)–9(d), 10(a)–10(d) and 11(a)–11(d), and FIGS. 24(a)–24(d), 25(a)–25(d) and 26(a)–26(d) are aberration diagrams of Example 2 similar to those of FIGS. 12(a)–12(d), 13(a)–13(d) and 14(a)–14(d). In each figure, (a), (b), (c) and (d) represent spherical aberration, astigmatism, chromatic aberration of magnification and transverse aberration, respectively.

The vibration-proof optical system according to the present invention as explained above, for instance, may be used as a taking objective a for a compact camera, the construction of which is schematically shown in the perspective and sectional views of FIGS. 27 and 28, respectively. In FIGS. 27 and 28, Lb is a taking optical path and Le is a finder optical path. The taking and finder optical paths Lb and Le are arranged parallel to each other, and the image of the subject is viewed through a finder consisting of a finder objective, an image-erecting prism, a stop and an eyepiece and is formed through the taking objective a on film (a photographic receiving element). It is here to be noted that the optical system of the present invention may also be used as a single-lens reflex camera's objective.

Alternatively, the optical system of the present invention may be build as an objective Ob in a video camera, as schematically shown in FIG. 29. As illustrated, projecting means, for instance, a solid-state image sensor made up of a CCD, etc., is mounted on an image-forming surface of the objective Ob in such a way that it can be focused thereon. Image signals converted by the solid-stage image sensor are electrically processed by processing means into signals, which can in turn be displayed on a liquid crystal display device or recorded on a recording medium, for instance, a magnetic tape. At the same time, sound signals fed via a microphone are electrically processed by this processing means into signals, which can likewise be recorded on a recording medium. It is here to be noted that the liquid crystal display device is referred to as an example alone; so CRTs or other image display means that can be monitored may be used.

One example for driving the blur compensating lens in the present invention is briefly explained with reference to the application of the optical system of the present invention to a single-lens reflex camera. The system generally includes an acceleration sensor for detecting the amount and direction of unintentional movement of the taking optical axis of a camera and driving means for driving the blur compensating lens in response to the amount and direction of unintentional movement detected by the acceleration sensor. Vibrations of the taking system, if any, are detected by the acceleration sensor, and the blur compensating lens is rotated around one point on the optical axis in response to the resulting signal, thereby obtaining a still image. The general construction of the system is shown in FIG. 30, the construction of the blur compensating optical system portion in FIG. 31, and the construction of the control system in FIG. 32. In FIGS. 30–32, reference numeral 11 stands for a camera itself, 12 a taking optical system (a principal lens), 13 a roof prism, 14 an eyepiece, 15 a quick return mirror, 16 a film surface (a taking surface), 17 a blur compensating optical system (a blur compensating lens), 18 an unintentional movement detecting means (an acceleration sensor), 19 a driving means (a disk type ultrasonic motor), 20 a control means, and 21 an electronic circuit.

According to the present invention as mentioned above, the meniscus lens concave on the image surface is located between the principal lens system for forming an object image and the image surface, and is inclined with respect to the optical axis, whereby the blurring of the taken image that occurs by the inclination of the principal lens system is compensated for. For this reason, the aberration variation due to the rotation of the image blur compensating optical system is so reduced that even upon unintentional movement of the taking optical system, it is possible to keep the ability to form images in a good enough state.

By conforming to conditions (1)–(3) as well as conditions (4)–(5), it is possible to design lens shape with a reduced aberration variation due to decentration even when the angle of rotation of the image blur compensating lens is small, while the corrected amount of the blurring of the image occurring by the inclination of the taking optical system is kept constant. Also, even when the blurring of the image occurs, the ability to form images can be maintained at a satisfactory level.

Furthermore in the present invention, since the center of rotation of the image blur compensating lens is fixed with respect to the image surface, the blurring of the taken image can be compensated for with a simplified mechanism. It is also possible to make rapid compensation for the blurring of the image without incurring size increases.

What we claim is:

1. A vibration-proof optical system comprising:
   a principal lens system including a plurality of lenses and having an overall positive refracting power;
   a blur compensating lens located in a rear of said principal lens system, said blur compensating lens consisting of a single lens of meniscus shape and having a concave surface on an image side thereof;
   a photographic receiving element located to said image side of said blur compensating lens; and
   driving means for tilting and decentering said blur compensating lens to compensate for an image blur caused by an inclination of said principal lens system.

2. The vibration-proof optical system according to claim 1, wherein said principal lens system comprises, in order from the object side;
   a first lens unit having positive refracting power;
   a second lens unit having negative refracting power;
   a third lens unit having positive refracting power; and
   a fourth lens unit having positive refracting power.

3. The vibration-proof optical system according to claim 2, wherein;
   zooming is carried out by varying a space between at least any adjacent pair of said first lens unit, said second lens unit, said third lens unit, and said fourth lens unit.

4. The vibration-proof optical system according to claim 1, which conforms to the following condition (1):

$$0.9 < \beta_1 < 1.1 \qquad (1)$$

wherein $\beta_1$ is a paraxial lateral magnification of said single lens of meniscus shape.

5. The vibration-proof optical system according to claim 1, which conforms to the following condition (2):

$$0.05 < |(R_1 - R_2)/(R_1 + R_2)| < 0.5 \qquad (2)$$

wherein $R_1$ and $R_2$ are radii of curvature of an entrance surface and an exit surface of said meniscus lens, respectively.

6. The vibration-proof optical system according to claim 1, which conforms to the following condition (3):

$$0.23 \times 10^{-3} < (d/D)((n-1)/\{\sqrt{(n^2 - \sin^2\theta)} + (1/n) - 1\}) < 2.31 \times 10^{-3} \qquad (3)$$

wherein D is a half of a diagonal length of a rectangular image surface from a first corner of said rectangular image surface to a diagonally opposite second corner of said rectangular image surface, d is a thickness of said single lens of meniscus shape, n is an index of refraction of said single lens of meniscus shape, and $\theta$ is an angle of rotation of said single lens of meniscus shape.

7. The vibration-proof optical system according to claim 1, which conforms to the following condition (4):

$$0.05 < |(R_1 - R_2)/(R_1 + R_2)| < 0.4 \qquad (4)$$

wherein $R_1$ and $R_2$ are radii of curvature of an entrance surface and an exit surface of said meniscus lens, respectively.

8. The vibration-proof optical system according to claim 1, which conforms to the following condition (5):

$$0.23 \times 10^{-3} < (d/D)((n-1)/\{\sqrt{(n^2 - \sin^2\theta)} + (1/n) - 1\}) < 1.5 \times 10^{-3} \qquad (5)$$

wherein D is a half of a diagonal length of a rectangular image surface from a first corner of said rectangular image surface to a diagonally opposite second corner of said rectangular image surface, d is a thickness of said single lens of meniscus shape, n is an index of refraction of said single lens of meniscus shape, and $\theta$ is an angle of rotation of said single lens of meniscus shape.

* * * * *